(12) United States Patent
He

(10) Patent No.: US 11,039,714 B2
(45) Date of Patent: Jun. 22, 2021

(54) AUTOMATED COOKING APPARATUS HAVING REDUCED FIRE HAZARD

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 633 days.

(21) Appl. No.: 15/801,923

(22) Filed: Nov. 2, 2017

(65) Prior Publication Data

US 2018/0116458 A1    May 3, 2018

Related U.S. Application Data

(63) Continuation of application No. 13/892,254, filed on May 11, 2013, now abandoned.

(51) Int. Cl.
*A47J 37/10* (2006.01)

(52) U.S. Cl.
CPC .................. *A47J 37/108* (2013.01)

(58) Field of Classification Search
CPC .......... A47J 37/108; A47J 27/12; A47J 36/00; A47J 36/02; A47J 2027/043; A47J 37/101; A47J 37/103; A47J 37/128; A47J 36/18; A47J 27/62; A47J 37/1266; A47J 37/07; A21B 7/00; A21B 7/005
USPC ......... 99/325, 326, 348, 352, 361, 367, 403, 99/422, 484; 220/231, 232, 252, 253, 220/361; 210/466, 467
See application file for complete search history.

(56) References Cited

U.S. PATENT DOCUMENTS

| | | | | |
|---|---|---|---|---|
| 3,777,094 A | * | 12/1973 | Peters, Jr. ............... | A47J 36/04 219/621 |
| 6,307,193 B1 | * | 10/2001 | Toole ...................... | A47J 36/06 126/386.1 |
| 8,334,004 B2 | * | 12/2012 | Liu .......................... | A23L 5/11 426/233 |
| 2004/0173103 A1 | * | 9/2004 | Won ........................ | A47J 36/32 99/326 |
| 2004/0187702 A1 | * | 9/2004 | Xu .......................... | A47J 36/38 99/422 |
| 2008/0296303 A1 | * | 12/2008 | Krent .................... | A47J 37/101 220/370 |

* cited by examiner

*Primary Examiner* — Dana Ross
*Assistant Examiner* — James F Sims, III

(57) ABSTRACT

An automated cooking apparatus includes a computer system configured to store a recipe and a cooking apparatus that includes: a frying pan that can hold food ingredients, a heater that can heat the frying pan under the control of the computer system based on the recipe, an exterior body that can hold the frying pan and the heater, and a lid that can keep food ingredients in the frying pan while the food ingredients are stirred and mixed during cooking. A lid-movement mechanism can open and close the lid under the control of the computer system. A transport mechanism can move the frying pan and the cooking apparatus, under the control of the computer system, to mix, stir, or distribute the food ingredients in the frying pan to produce a cooked food.

20 Claims, 23 Drawing Sheets

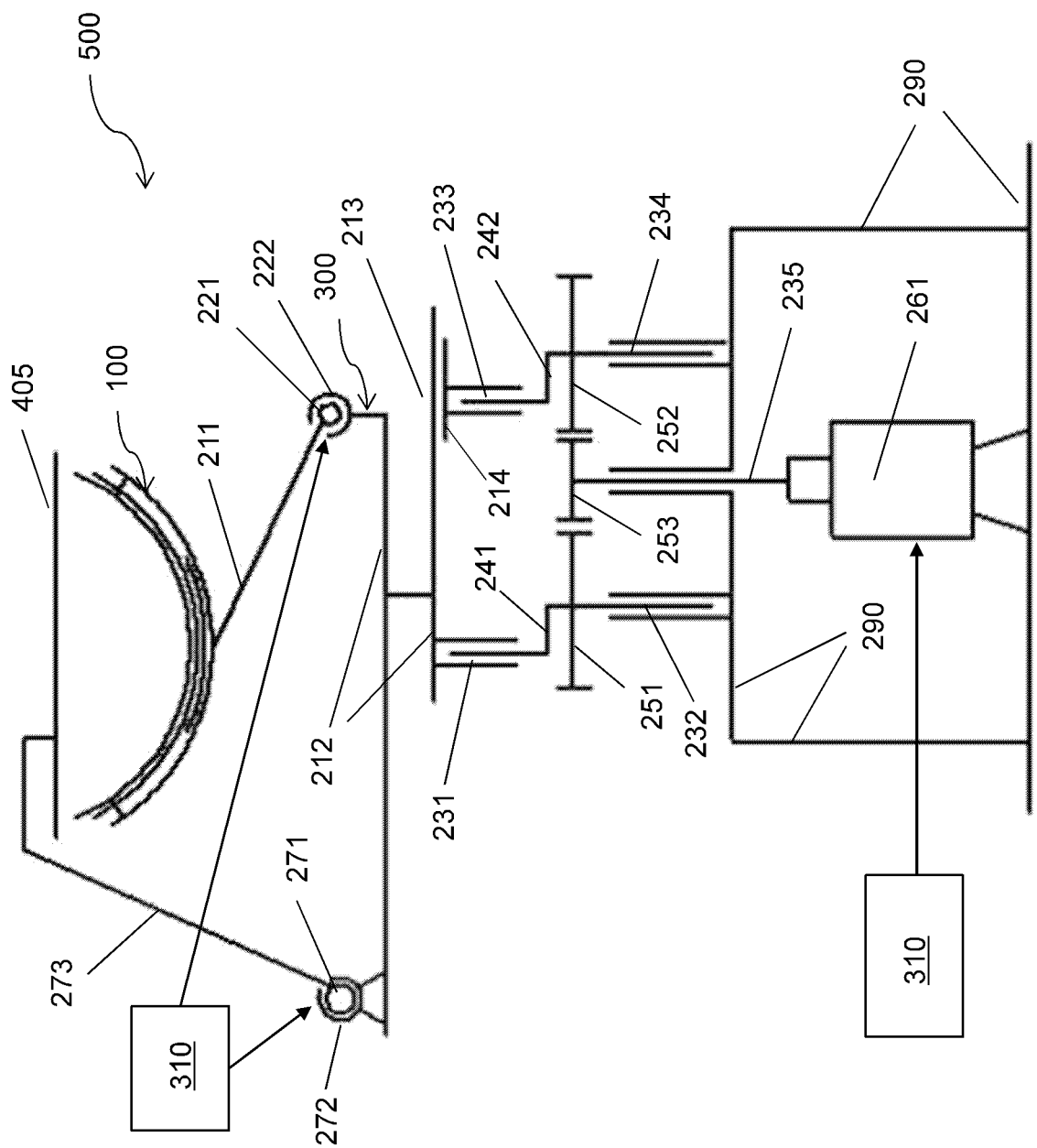

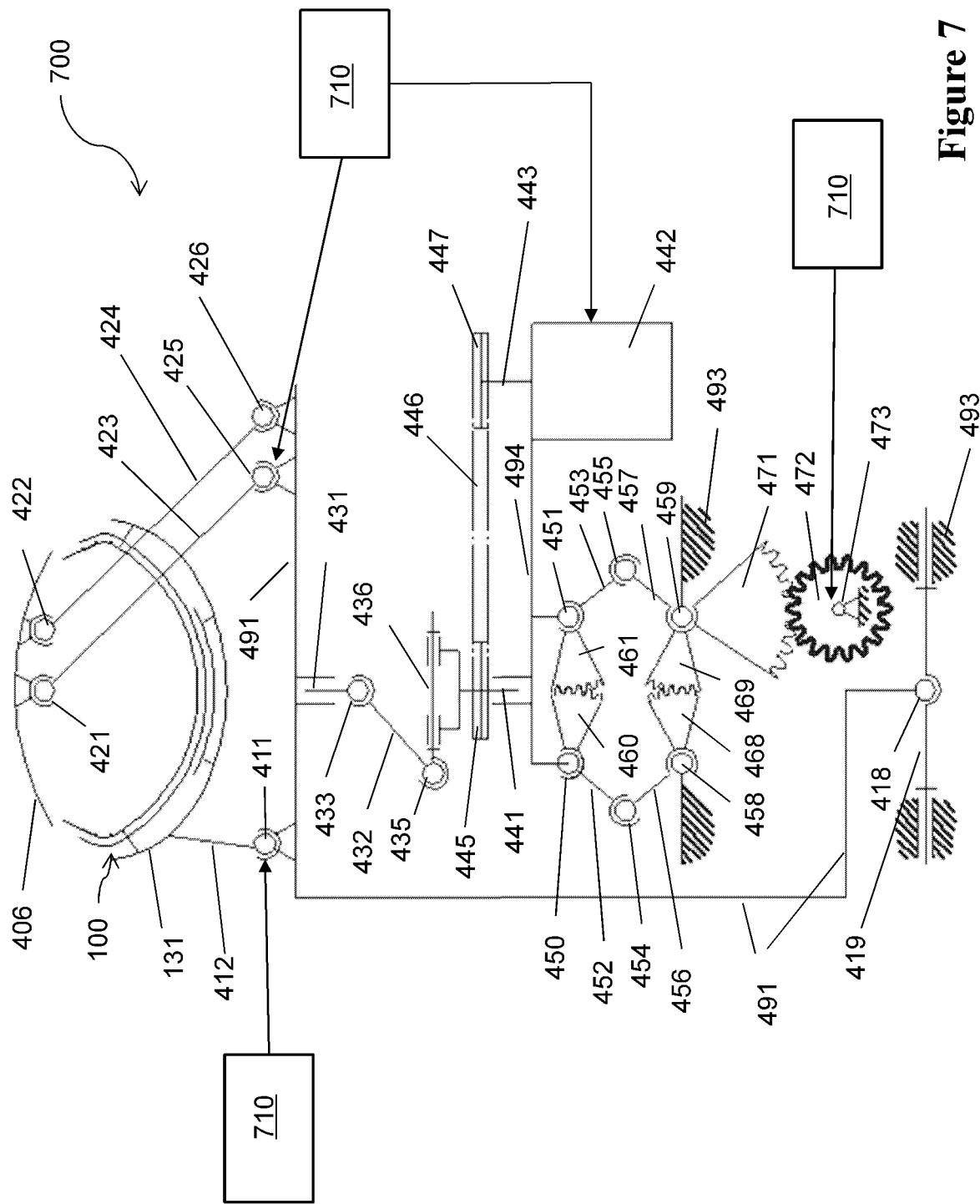

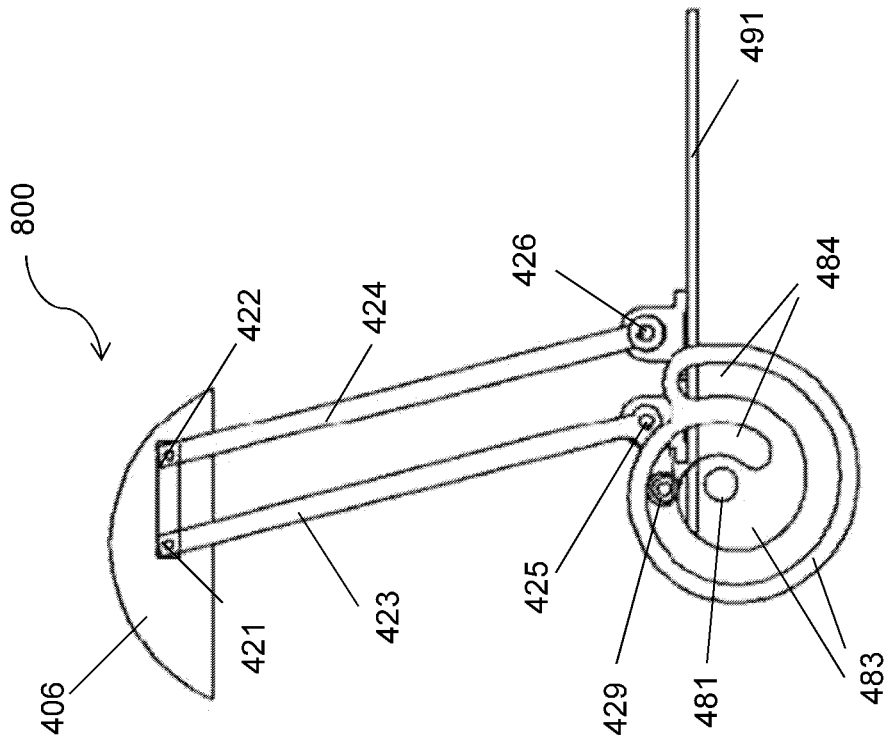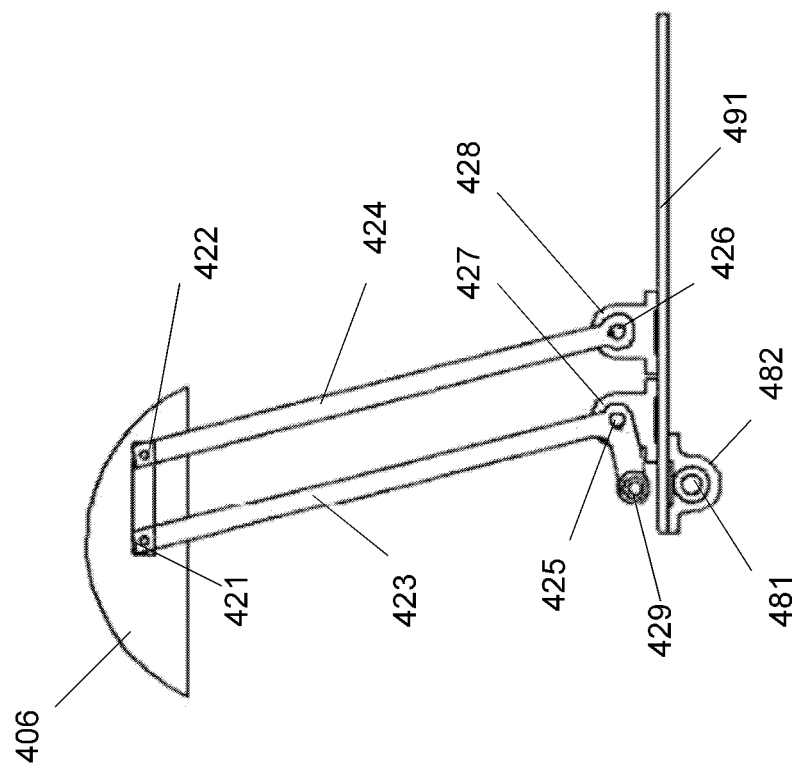
Figure 8B
Figure 8A

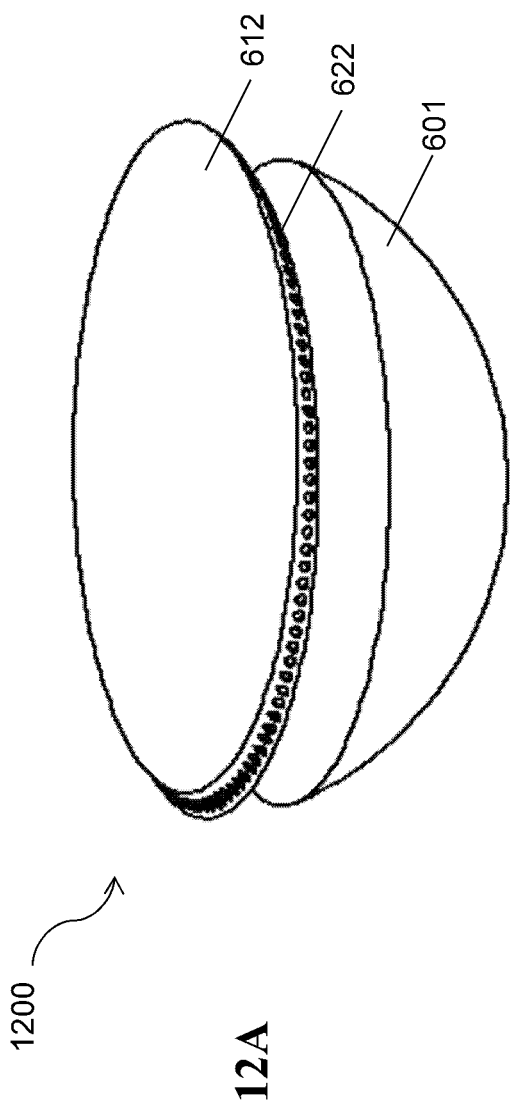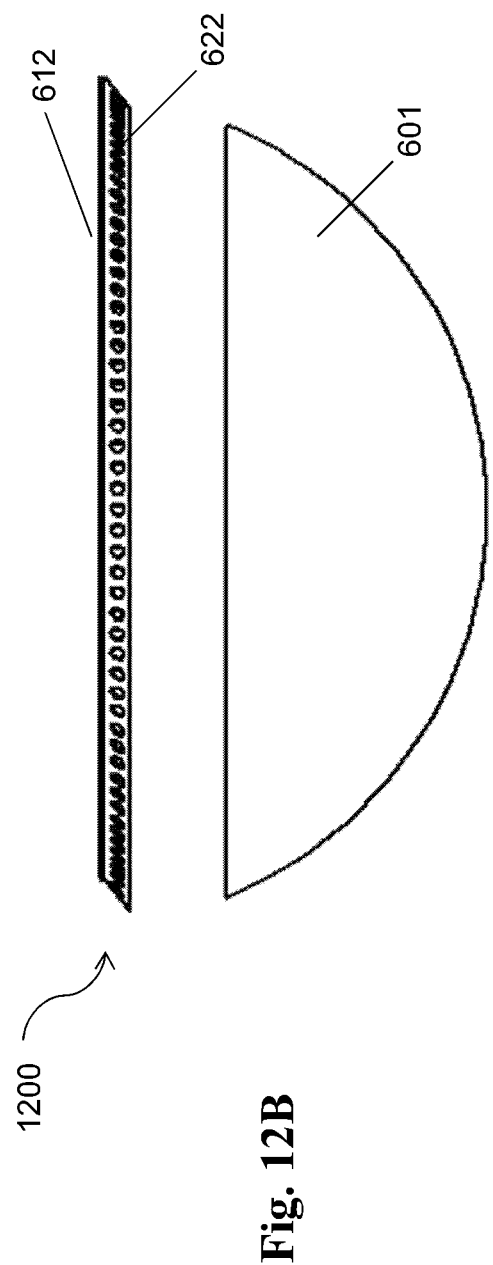
Fig. 12A
Fig. 12B

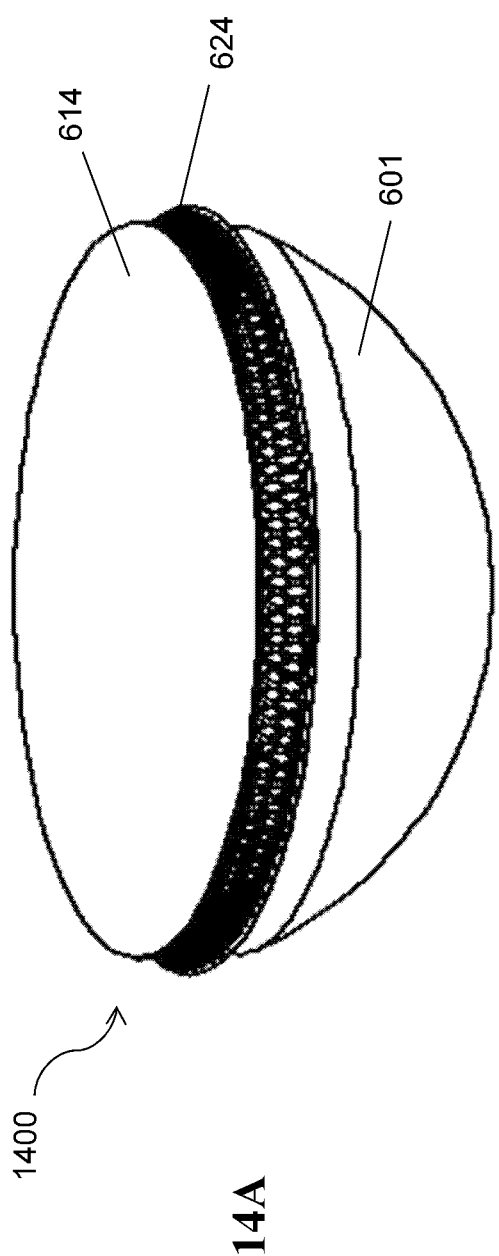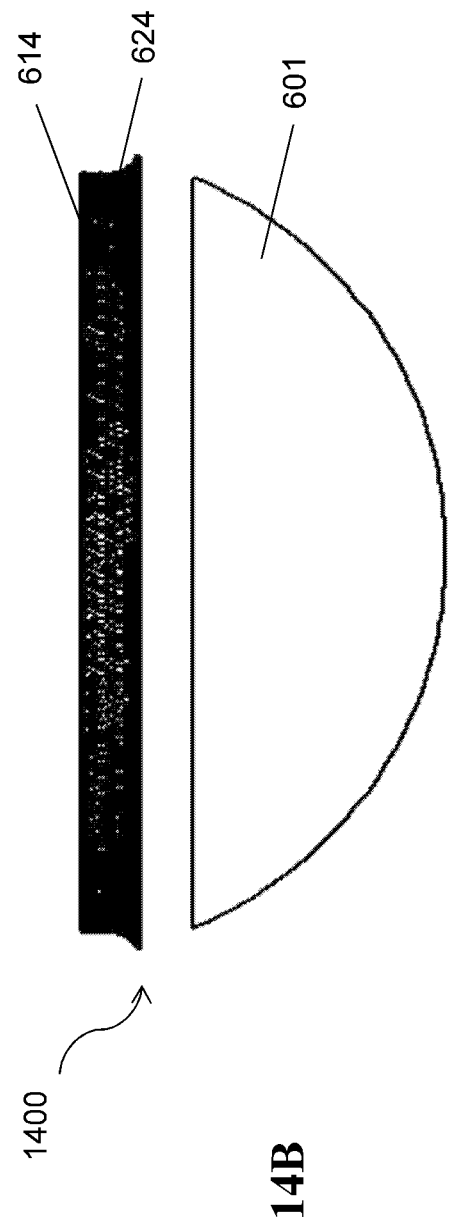
Fig. 14A
Fig. 14B

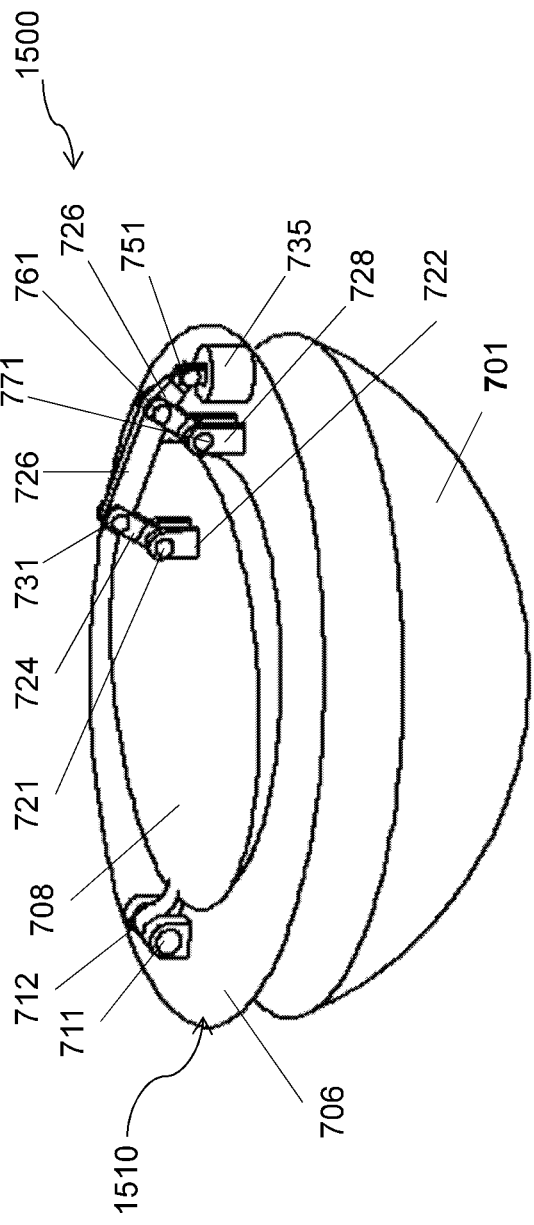
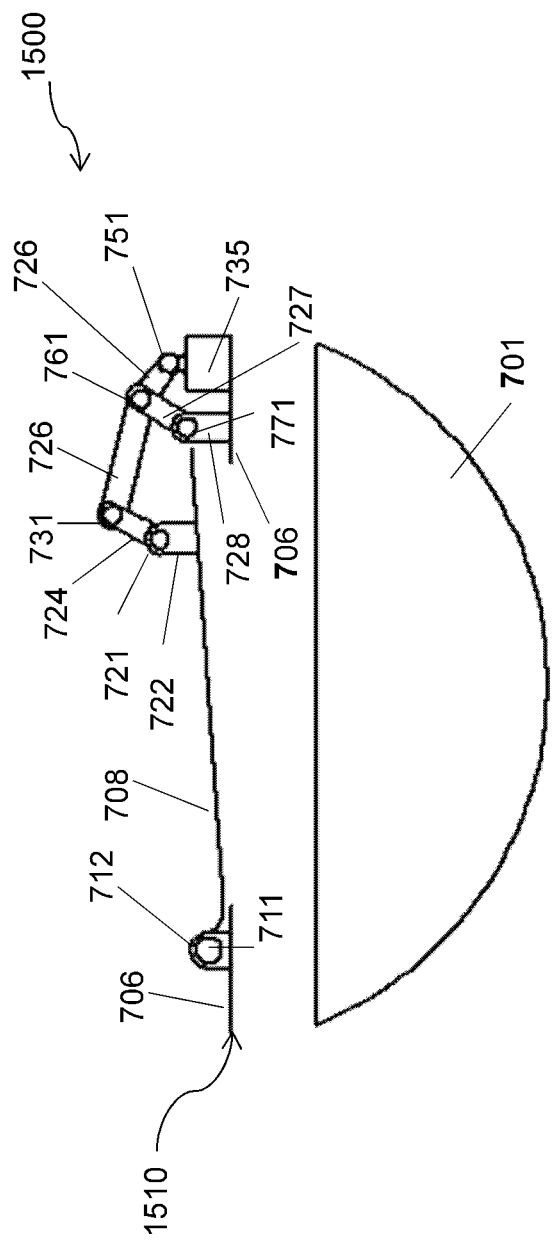
Fig. 15A
Fig. 15B

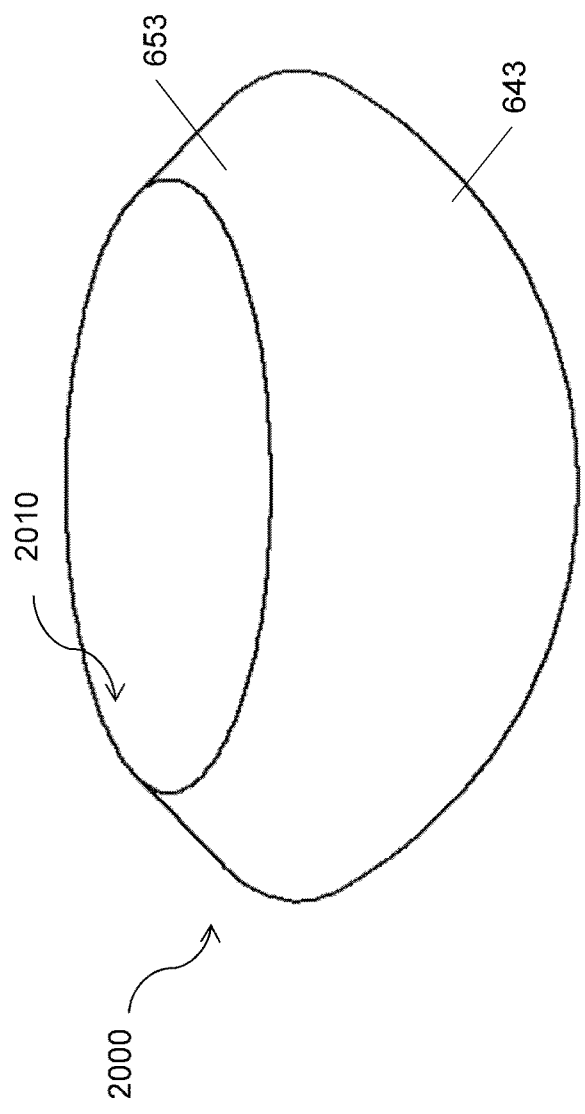
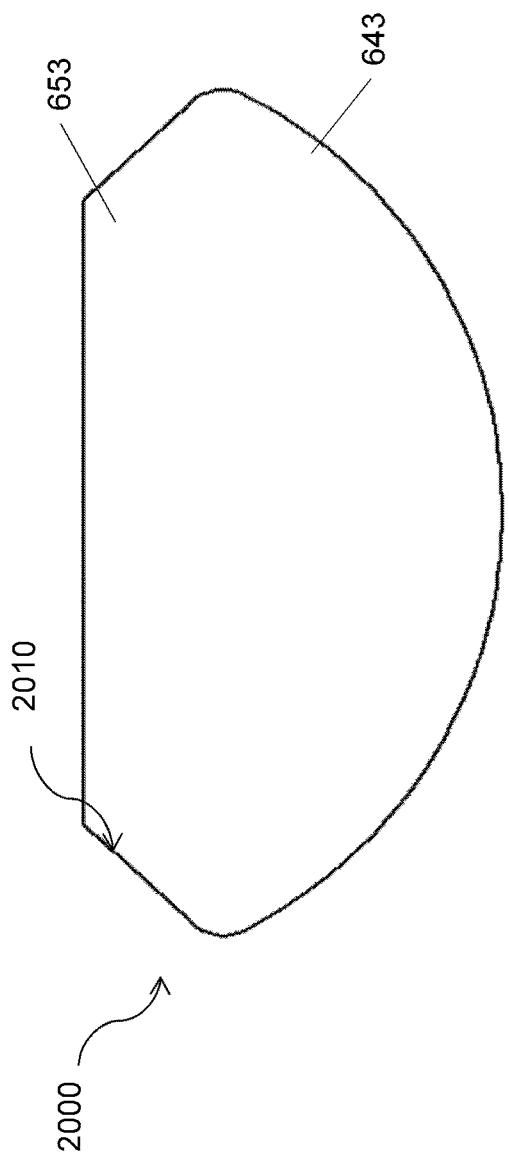
Fig. 20A
Fig. 20B

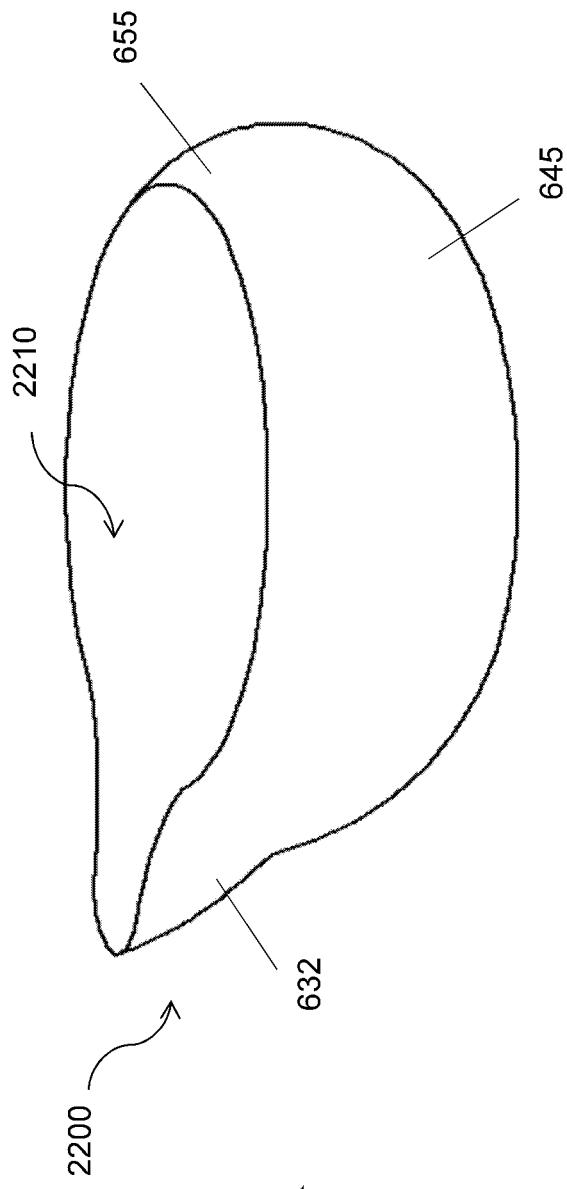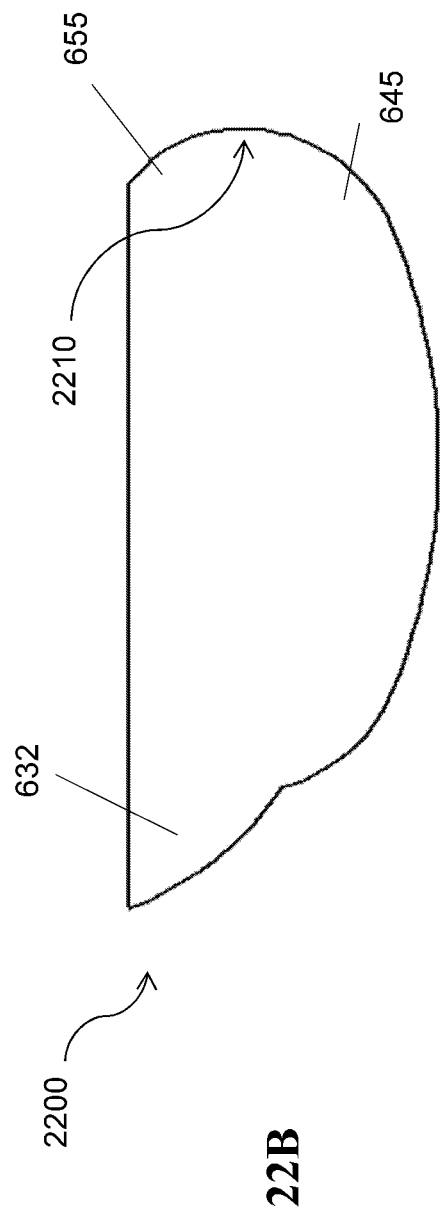
Fig. 22A
Fig. 22B

AUTOMATED COOKING APPARATUS HAVING REDUCED FIRE HAZARD

This application is a continuation of U.S. application Ser. No. 13/892,254 filed May 11, 2013 entitled "Automated Cooking Apparatus Having Air Flow Regulation and Reduced Fire Hazard," the disclosure of which are hereby incorporated herein by reference in their entireties.

CROSS-REFERENCE TO RELATED APPLICATIONS

U.S. Patent Application:
Ser. No. 13/892,254, Filed: May 11, 2013, Inventor: Zhengxu He

BACKGROUND OF THE INVENTION

The present application relates to automated kitchen equipment, and specifically to automated cooking apparatus for cooking food ingredients.

In certain automated cooking apparatus, automated fry apparatus in particular, the mixing, stirring or distributing of food ingredients in the frying pan may be achieved by moving the frying pan. The food ingredients can have fast movement relative to the frying pan; and at times the food ingredients may jump. When food ingredients jump out of the frying pans, it not only creates waste but also presents a fire hazard. Some food ingredients, such as oil or fat, may be combustible. On the other hand, in traditional automated heated cooking, the outer surface of the frying pan may be over heated, and thus may start a fire. Such a fire can be dangerous in an automated cooking environment as very few humans, if any, are present. In addition, the heater not only may get in the way of the movement of the frying pan, but also may present a fire hazard.

Thus there is a need for an automated cooking apparatus that can provide proper stirring and mixing of food ingredients during cooking while minimizing food waste and preventing fire hazard. Moreover, there is a need to thermally insulate the heater and the exterior surface of the frying pan.

SUMMARY OF THE INVENTION

The present application discloses an automated cooking apparatus that overcome the drawbacks in conventional cooking systems. The disclosed automated cooking apparatus can provide proper stirring and mixing of food ingredients during cooking while minimizing food waste and preventing fire hazard.

In the automated cooking apparatus, at some of the heated areas are thermally insulated to concentrate heat in the frying pan, which increases the energy efficiency and further minimizes fire hazard.

In one general aspect, the present invention relates to an automated cooking apparatus that includes a computer system configured to store a recipe; a frying pan that can hold food ingredients; a heater that can heat the frying pan under the control of the computer system based on the recipe; a lid that can keep food ingredients in the frying pan while the food ingredients are stirred and mixed during cooking; a lid-movement mechanism that can open and close the lid under the control of the computer system; and a motion mechanism that can move the frying pan and the lid-movement mechanism under the control of the computer system, to mix, stir, or distribute the food ingredients in the frying pan to produce a cooked food.

Implementations of the system may include one or more of the following. The lid-movement mechanism can open and close the lid while the motion mechanism moves the frying pan and the lid-movement mechanism under the control of the computer system. The lid can include one or more openings. The one or more openings in the lid can be covered by a net or a screen. The automated cooking apparatus can further include a cover that can close the one or more openings in the lid or keep the one or more openings in the lid open under the control of the computer system, which regulates air flow in and out of the frying pan. The cover can be opened or closed while the motion mechanism moves the frying pan and the lid-movement mechanism under the control of the computer system. The cover can be hinged to the lid. The cover may be separable from the lid. The frying pan can include a thermal insulation that can keep heat generated by the heater inside the frying pan. The automated cooking apparatus can further include a dispensing mechanism that can dispense food ingredients into the frying pan under the control of the computer system. The automated cooking apparatus can further include an unloading mechanism that can turn the frying pan to unload the cooked food from the frying pan. The frying pan can include a spout or an opening that can unload the food ingredients from the frying pan. The spout can have a shape of a tunnel. The automated cooking apparatus can further include a sprout cover that can cover and seal the spout under the control of the computer system. The frying pan can have a portion of an interior surface facing downward which obstructs the food ingredients from jumping out of the frying pan when the food ingredients are mixed, stirred, or distributed by the motion mechanism. The automated cooking apparatus can further include a frame that can support the frying pan and the lid-movement mechanism, wherein the motion mechanism can move the frame under the control of the computer system. The lid-movement mechanism can move the lid by rotation, or a linear motion, or a combination thereof. The lid-movement mechanism can include a primary turning pair comprising a first mating part and a second mating part, wherein the first mating part of the primary turning pair is connected to the lid, and wherein the lid-movement mechanism comprises a sub mechanism that can rotate the second mating part of the primary turning pair. The lid-movement mechanism can further include a secondary turning pair comprising a first mating part and a second mating part, wherein the first mating part of the secondary turning pair is connected to the lid, and a second sub-mechanism that can restrain the movement of the second mating part of the secondary turning pair to a rotation relative to the holder, wherein the axes of the primary turning pair and the secondary turning par are parallel to each other. The lid can include an inlet and an outlet, the automated cooking apparatus can further include: an air pump that can pump air into the inlet, and/or to exhaust air from the outlet under the control of the computer system.

In another general aspect, the present invention relates to an automated cooking apparatus that includes: a computer system that can store a recipe; a cooking apparatus, comprising: a frying pan that can hold food ingredients; a heater that can heat the frying pan under the control of the computer system based on the recipe; an exterior body that can hold the frying pan and the heater; and a lid that can keep food ingredients in the frying pan while the food ingredients are stirred and mixed during cooking; a lid-movement mechanism that can open and close the lid under the control of the computer system; and a motion mechanism that can move the frying pan and the cooking apparatus, under the control of the computer system, to mix, stir, or distribute the food ingredients in the frying pan to produce a cooked food.

These and other aspects, their implementations and other features are described in detail in the drawings, the description and the claims.

BRIEF DESCRIPTION OF THE DRAWINGS

FIG. 5 shows a schematic view of an automated cooking apparatus with an automated lid.

FIG. 7 shows a schematic view of another automated cooking apparatus with an automated lid.

FIGS. 8A-8C show side views of part or whole of an automated lid in different working positions.

FIGS. 12A-12B show an aerial view and side view of a lid and a frying pan.

FIGS. 14A-14B show an aerial view and side view of a lid and a frying pan.

FIGS. 15A-15B show an aerial view and side view of an automated lid and a frying pan.

FIGS. 20A-20B show an aerial view and side view of a frying pan.

FIGS. 22A-22B show an aerial view and side view of a frying pan with a spout.

DETAILED DESCRIPTION OF THE INVENTION

Figure 1:
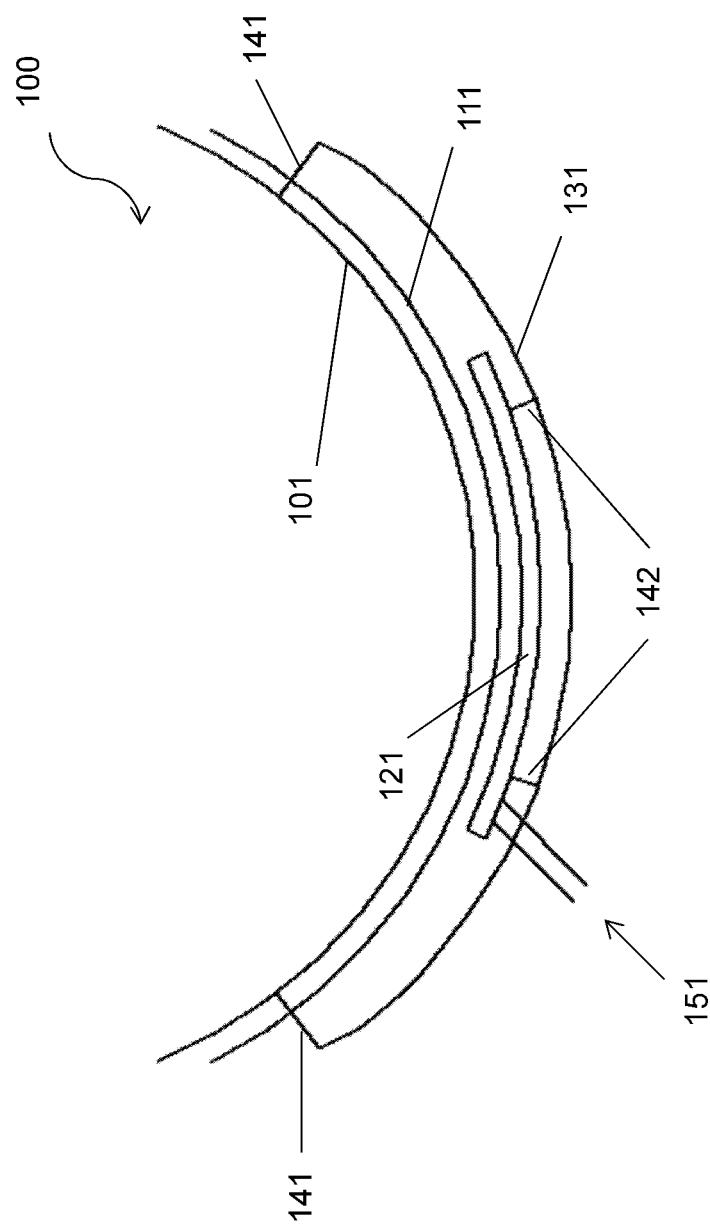
FIG. 1 shows a schematic view of a frying pan with a built-in heater.

In some embodiments, referring to FIG. 1, a cooking apparatus 100 includes a frying pan 101 which may hold food or food ingredients, a thermal insulator 111, an electromagnet 121 and an exterior body (or frame) 131. The frying pan 101 is partially or entirely made of ferromagnetic material (such as iron or its alloys). The electromagnet 121 is configured to receive high frequency alternating current from an external source via the outlet 151, which can be controlled by a computer (not shown in FIG. 1). The alternating electromagnetic field generated by the electromagnet 121 can create conduction currents in the frying pan 101, which converts to thermal energy. The thermal insulator 111 keeps heat generated in the frying pan 101. The frying pan 101 is connected to the exterior body 131 by connectors 141, and the electromagnet 121 is connected to the exterior body 131 by connectors 142. The thermal insulator 111 is also connected to the exterior body 131. The thermal insulator 111 covers the exterior of the frying pan, and particularly it insulates the electromagnet 121 from the frying pan 101.

Figure 2:
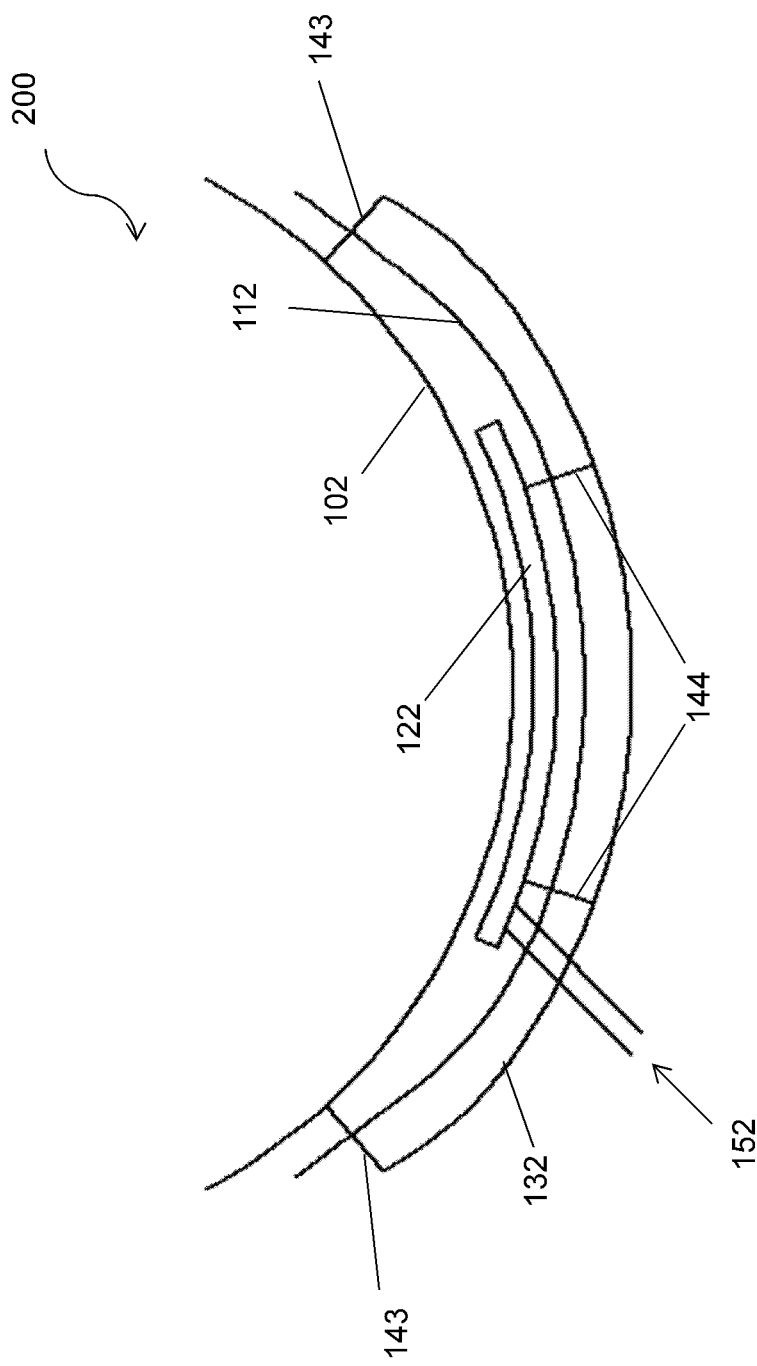
FIG. 2 shows a schematic view of another frying pan with a built-in heater.

In some embodiments, referring to FIG. 2, a cooking apparatus 200 includes a frying pan 102 which may hold food or food ingredients, a thermal insulator 112, a heater 122, and an exterior body (or frame) 132 that holds the frying pan 102, the thermal insulator 112, and the heater 122. The frying pan 102 is connected to the exterior body 132 by connectors 143, and the heater 122 is connected to the exterior body 132 by connectors 144. The thermal insulator 112 is also connected to the exterior body 132. The thermal insular 112 insulates the heater 122 and the exterior of the frying pan 102 from the outside. The heater 122 includes a heating device which is a gas or oil burner with air and fuel injection and exhaust ventilation via the outlet 152. As part of the cooking operations, the heater 122 can be activated to heat the frying pan 102 based on a recipe under the control of the computer system (e.g. 310 in FIGS. 3, 5, 6, 7 and 9, or 710 in FIG. 79).

The cooking apparatus 100, 200 in FIGS. 1 and 2 are suitable for cooking methods such as stirring frying, frying, stewing, pan fry, stir fry, deep fry, sautéing, hot sand frying . . . , etc. The term "frying pan" refers to a cooking container suitable for the previously described cooking methods. Frying pan may have a flat or curved bottom. Frying pan can also be referred to as a fry pan, a fry pot, a wok, a cooking pot, a pot, etc. One or more food ingredients can include oil, salt, sugar, vegetables, meat, water, precooked food such as noodles and rice, etc. Different food ingredients may be added to the frying pan at different times and at different temperatures. The food ingredients can be stirred, mixed, and tumbled using mechanisms as described in detail below. It should also be noted that the heating device in the heater 122 may be implemented by an electric heater with resistance wires, in which case electric wires may be connected via the outlet 152.

Figure 3:
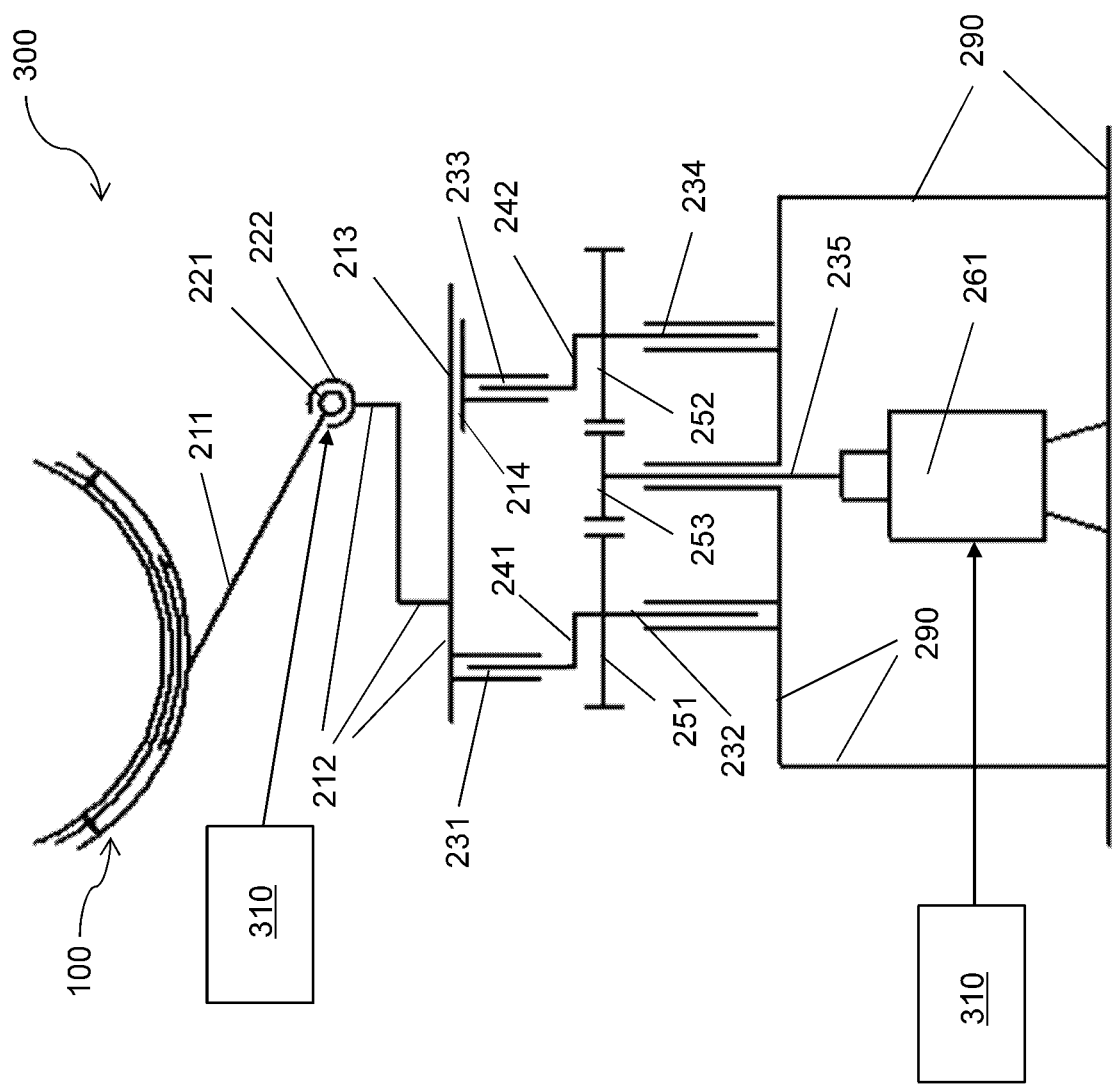
FIG. 3 shows a schematic view of an automated cooking apparatus wherein a frying pan has a built-in heater.

In some embodiments, referring to FIG. 3, an automated cooking apparatus 300 includes a cooking apparatus 100, a frame 212 (or, a holder), and a turning pair consisting of a shaft 221 in a sleeve 222. The cooking apparatus 100 is rigidly connected to the shaft 221 through a connector 211, and the frame 212 is rigidly connected to the sleeve 222. The rotation of the shaft 221 around its sleeve 222 may be driven by a motor through a mechanical apparatus (e.g., as in FIGS. 6A-6B below), where the motor may be controlled by a computer system 310. Two shafts 231 and 233 are respectively connected to shafts 232 and 234 by the connectors 241 and 242 respectively. The frame 212 is rigidly connected to a sleeve of the shaft 231, so that the shaft 231 may rotate relative to the frame 212. A sliding pair consists of two mating parts 213 and 214, with the mating part 213 rigidly connected to the frame 212, and the mating part 214 rigidly connected a sleeve of the shaft 233. The sleeves of 232 and 234 are rigidly connected to a support frame 290. A gear 251 is mounted on the shaft 232 and has the same axis as the shaft 232. A second gear 252 is mounted on the shaft 234 and has the same axis as the shaft 234. The gears 251 and 252 are both engaged with a third gear 253 that is mounted on the shaft 235 of a motor 261. The gear 253 and the shaft 235 have the same axis. The motor 261 is mounted on the support frame 290. The axes of the shafts 231, 233, 232, 234 and 235 are all parallel to each other. The gears 251 and 252 have the same radius so that they may rotate synchronously. The distance between the axes of the shafts 231 and 232 is the same as the distance between the axes of the shafts 233 and 234; and the plane through the axes of the shafts 231 and 231 is parallel to the plane through the axes of the shafts 233 and 234. The motor 261 may be controlled by the computer system 310. As the motor 261 rotates, the shafts 232 and 234 may rotate synchronously, thus driving the shafts 231 and 233 into synchronous rotations, thus driving the frame 232, and hence the cooking apparatus 100 into a circular movement without self-rotation.

In the present disclosure, the computer system can include one or more processors, one or more controllers, memory that store recipe and control programs for cooking, communication devices for wired or wireless communications, a display device, and input and output device.

It should be noted that instead of being parallel to each other, the axes of the shafts 231, 233, 232, 234 and 235 may all pass through a same point.

It should also be noted that the sliding pair with mating parts 213 and 214 in the apparatus 300 may be modified as follows: the mating part 214 may be substituted by a cylinder (or a cylindrical shell) whose axis is the same as (or parallel to) the axis of the shaft 233, and the mating part 213 may be substituted by two walls that restrain the cylinder so the cylinder lies between the walls. The surface of the walls may be flat and both parallel to the plane through the axes of the shafts 233 and 231. The axis of the cylinder is parallel to the surfaces of the two walls. The distance between the surfaces of the two parallel walls may be equal to the diameter of the cylinder, so the cylinder may fit well in between the walls.

It should be further noted that the motion mechanism in the automated cooking apparatus 300 may be replaced by other notion mechanism that can move the frame 212. The movements may include but are not limited to circular, linear, planar, spherical, cyclic, vibratory, oscillatory movements or combinations thereof, and the magnitude of the movements may further be adjusted. Providing the capability of a plurality of complex cyclic, vibratory or oscillatory movements allows more effective stirring, tumbling, aeration, and mixing of food ingredients, which enable a wider range of cooking recipe and cooking styles. It should also be noted that the cooking apparatus 100 may be replaced by other types of frying pans, with or without a built-in heating.

Figure 4B:
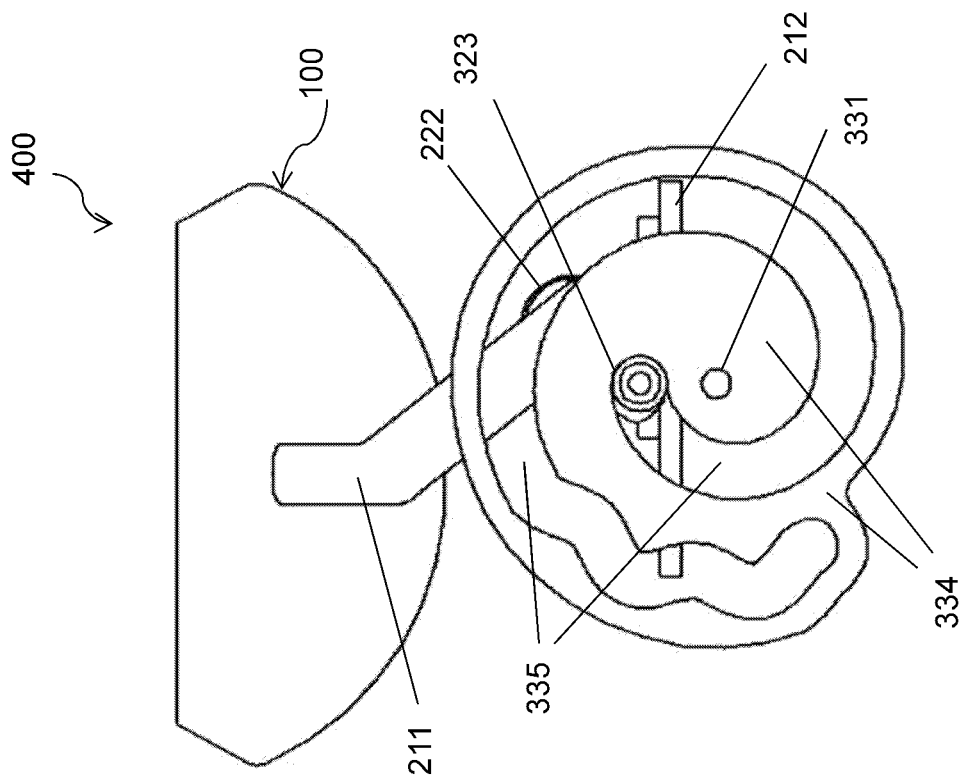
FIGS. 4A and 4B show side views of an unloading apparatus for a frying pan.
Figure 4A:
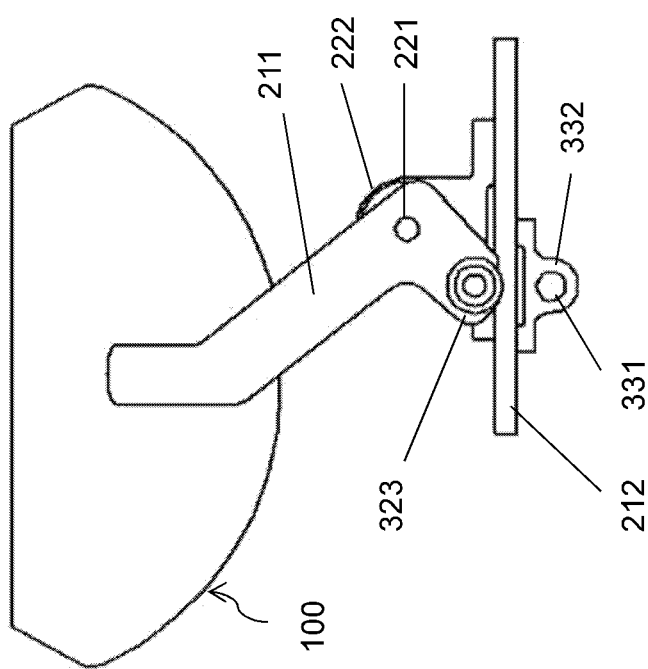

In some embodiments, referring to FIGS. 4A-4B, an unloading apparatus 400 includes a cooking apparatus 100, a frame (or holder) 212, and a turning pair with shaft 221 and sleeve 222 as mating parts. A connector 211 connects the cooking apparatus 100 with the shaft 221. The shaft of a free wheel 323 is mounted on an extension of the connector 211 (FIG. 4A). A bearing is inserted between the free wheel 323 and its shaft so that the free wheel 323 may rotate freely around its shaft. The sleeve 222 is rigidly connected to a frame 212. A second turning pair has a shaft 331 and sleeve 332 as mating parts, with the sleeve 332 rigidly connected to the frame 212. A wheel 334 is mounted on the shaft 331 (FIG. 4).

The wheel 334 has a carved track 335 so the free wheel 323 may fit in and slide in the carved track. The rotation of the wheel 334 around the axis of the shaft 331 is driven by a motor (not shown in Figure) which is controlled by a computer system (e.g. 310 in FIG. 3, not shown in FIGS. 4A and 4B). As the wheel 334 rotates, the free wheel 323 is moved, thus rotating the connector 211 around the axis of the shaft 221. The cooking apparatus 100 may thus be rotated around the axis of the shaft 221. This can be used to unload the cooked or semi-cooked food from the frying pan.

It should be noted that the cooking apparatus 100 in the apparatus 400 may be substituted by other frying pans, with or without built-in heating. It should also be noted that the unloading apparatus 400 may be substituted by a rotation mechanism that rotate the motion mechanism that moves the frying pan.

In some embodiments, referring to FIG. 5, an automated cooking apparatus 500 includes the automated cooking apparatus 300, a lid 405, and a lid-movement mechanism as follows. A shaft 271 is connected to the lid 405 through a connector 273. The sleeve of the shaft 271 is connected with the frame 212, so the shaft 271 may rotate relative to the frame 212. A motor (not shown in Figure) can drive the rotation of the shaft 271 relative to the frame 212 under the control of a computer system 310. As the motor rotates the shaft 271, the lid 405 may be moved between a position to cover the frying pan of the cooking apparatus 100 and a position away from the frying pan.

Figure 6:
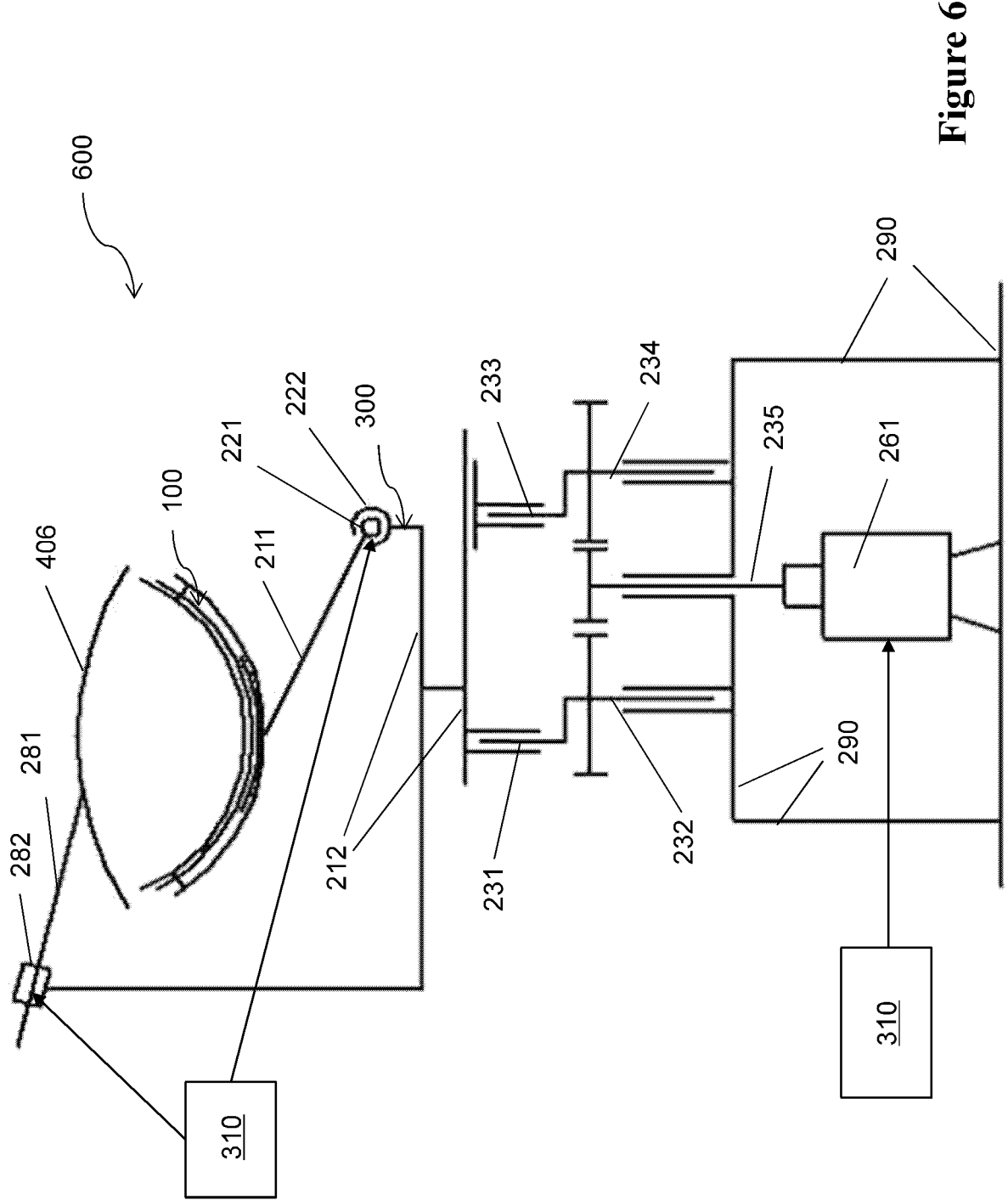
FIG. 6 shows a schematic view of another automated cooking apparatus with an automated lid.

In some embodiments, referring to FIG. 6, an automated cooking apparatus 600 includes the automated cooking apparatus 300, a lid 406, and a lid-movement mechanism as follows. An end of a rod 281 is connected to the lid 406. The rod 281 and a mating part 282 form a sliding pair. The mating part 282 is mounted on the frame 212, so that the rod 281 may slide linearly relative to the frame 212. A powered mechanism (not shown in Figure) can drive the sliding of the rod 281 relative to the frame 212 under the control of a computer system 310. As the powered mechanism slides the rod 281, the lid 406 may be moved between a position to cover the frying pan of the cooking apparatus 100 and a position away from the frying pan. It should be noted that there are many different implementations for the powered mechanism, e.g., a lead screw mechanism or ball screw mechanism powered by a motor, or a pneumatic, hydraulic or electromagnetic cylinder.

In some embodiments, referring to FIG. 7, an automated cooking apparatus 700 includes a cooking apparatus 100 (with detailed structures shown in FIG. 1), a lid 406 that can cover the frying pan, and a frame (or holder) 491. A shaft 411 is connected to the exterior body 131 of the cooking apparatus 100 through a connector 412. A sleeve of the shaft 411 is connected with the frame 491, so the shaft 411 may rotate relative to the frame 491. A motor (not shown in Figure) drives the rotation of the shaft 411 relative to the frame 491 (e.g., through a mechanical apparatus as in FIGS. 4A-4B), and a computer system 710 may control the motor. The shaft 411 and its sleeve, the connector 412 and the motor driving the rotation of the shaft 411 form an unloading mechanism. The sleeves of two shafts 421 and 422 are connected with the lid 406. The shafts 421 and 422 are respectively connected to shafts 425 and 426 through connectors 423 and 424 respectively. The sleeves of the shafts 425 and 426 are both connected to the frame 491. The axes of the shafts 421, 422, 423 and 424 are parallel to each other. A motor (not shown in Figure) may drive the rotation of the shaft 425 relative to the frame 491 (e.g., through a mechanical apparatus as in FIGS. 6A-6C), under the control of the computer system 710. The shafts 421, 422, 425, 426, their sleeves, and the connectors 423 and 424 form part of a lid-movement mechanism that opens and closes the lid 406. It should be noted that, the shaft 421 and its sleeve form a primary turning pair of the lid-movement mechanism, where the sleeve is connected to the lid 406, and the shaft 421 may be actively rotated by a motor under the control of the computer system 710; while the shaft 422 and its sleeve form a secondary turning pair of the lid-movement mechanism, where the sleeve is connected with the lid and the shaft 422 is passively constrained to rotate around the axis of the shaft 426. The motor driven rotation of the shaft 421 and the constraint on the movement of the shaft 422 together move the lid 406 to or away from the frying pan.

A stabilization mechanism consists of a shaft 418 whose sleeve is connected with another shaft 419. The shaft 419 has sleeves that are connected with a support frame 493, so that the shaft 419 may freely rotate relative to the support frame 493. The axes of the shafts 418 and 419 are not parallel to each other.

A motion mechanism includes a shaft 431 whose sleeve is connected with the frame 491. The shaft 431 is connected with another shaft 433, where the axes of the shafts 431 and 433 may not be parallel. The axes of the shafts 431 and 433 may intersect at 90 degrees of angle, although this is not a requirement. A connector 432 connects the sleeve of the shaft 433 and a shaft 435, where the axes of the shafts 433 and 435 may not be parallel. The sleeve of the shaft 435 is connected to a shaft 436, where the axes of the shafts 435 and 436 may not be parallel. The axis of the shaft 436 may be horizontal although this is not a requirement. The shaft 436 has some sleeves that are connected with a shaft 441, wherein the axes of the shafts 436 and 441 may not be parallel. The axis of the shaft 441 may be vertical and intersect with the axis of the shaft 436 at 90 degrees of angle, but this is not a requirement. The shaft 441 has a sleeve that is connected with a frame 494 so that the shaft may rotate around its own axis relative to the frame 494. A chain wheel 445 is mounted on and is concentric with the shaft 441. A second chain wheel 447 is mounted on and is concentric with the shaft 443 of a motor 442 under the control of the computer system 710. A chain 446 wraps around the chain wheels 445 and 447. The axes of the shafts 431, 441, 418 and 419 may intersect at a point, but this is not a requirement. Through the chain 446, the motor 442 may drive the shaft 441 in a continuous rotation around its own axis, and thus drive the shafts 436, 435, 432, 433 and 431 into a rotation around the axis of the shaft 441. Together with the stabilization mechanism, such a motion may cyclically move the frame 491 and hence the cooking apparatus 100. In case the axes of the shafts 418 and 419 intersect at a point, the cooking apparatus 100 are restricted to spherical motions around the point of intersection. If the axes of the shafts 441, 431, 418, 419 all intersect at a point, then in the movements produced by the motion mechanism and constrained by the stabilization mechanism, the trajectory of a "center" point (e.g., a point on the intersection of the frying pan and the axis of the shaft 431) on the cooking apparatus 100 is a circle.

It should be noted that the lid-movement mechanism responsible for opening and closing the lid 406 is mounted on the frame 491. Thus the lid-movement mechanism moves together with cooking apparatus 100 (including the frying pan) in the movements produced by the motion mechanism and restrained by the stabilization mechanism.

An adjustment mechanism includes shafts 450 and 451 which are connected with the frame 494, and their respective sleeves. A partial gear 460 is connected with the sleeve of the shaft 450; and a second partial gear 461 is connected with the sleeve of the shaft 451. The partial gears 460 and 461 are engaged, and have the same radius. The sleeves of the shafts 450 and 451 are respectively connected with the sleeves of two shafts 454 and 455 by connectors 452 and 453 respectively. The shafts 454 and 455 are respectively connected with the sleeves of the shafts 458 and 459 by the connectors 456 and 457 respectively. The shafts 458 and 459 are both connected with the support frame 493. A partial gear 468 is connected with the sleeve of the shaft 458; and a second partial gear 469 is connected with the sleeve of the shaft 459. The partial gears 468 and 469 are engaged, and have the same radius. Another partial gear 471 is connected with the sleeve of the shaft 459. The shaft 473 of a gear 472 has a sleeve which is connected with the support frame 493. The gears 471 and 472 are engaged, and a motor (not shown in Figure) drives the rotation of the gear 472 around its axis under the control of the computer system 710. As the gear 472 is rotated, the partial gear 471, and thus the sleeve of the shaft 459 and the partial gear 469 are rotated around the shaft 459. Then, the partial gear 468, the sleeve of the shaft 458, and the sleeves of the shafts 450 and 451 are all rotated, thus moving the frame 494 and hence the shaft 436 (up or down as visible in Figure). As a result, the angle of inclination of the connector 432 may be changed, and thus the angle between the axes of the shafts 441 and 431 may be adjusted. The angle between the axes of the shafts 441 and 431 affects the magnitude of the cyclic movement produced by the motion mechanism.

It should be noted that the adjustment mechanism in the automated cooking apparatus 500 may be replaced by a jack, or by apparatus that can move the frame 494 relative to the support frame 493. It should be further noted that the motion mechanism in the apparatus 500 may be replaced by other motion mechanisms that can move the frame 491. The cooking apparatus 100 may be substituted by a frying pan of other type, with or without built-in heating.

Figure 8C:
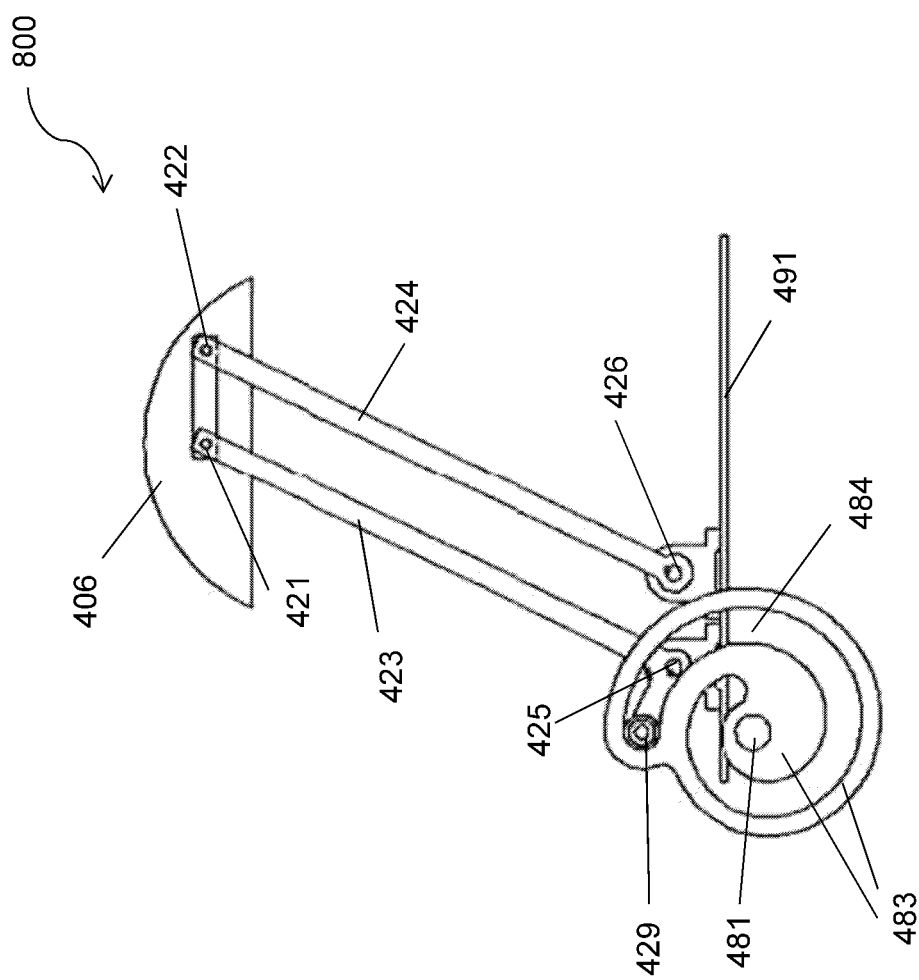

In some embodiments, referring to FIGS. 8A-8C, an automated lid system 800 includes a lid 406 for a frying pan, and two shafts 421 and 422 whose sleeves are connected with the lid 406. Two shafts 421 and 422 are respectively connected to shafts 425 and 426 through connectors 423 and 424 respectively. The sleeve 427 of the shaft 425 and the sleeve 428 of the shaft 426 are both connected to a frame 491 (FIG. 8A). (The frame 491 may be moved by a motion mechanism as in the apparatus 700 in FIG. 7.) A free wheel 429 has a shaft connected with an extension of the connector 423, and a bearing may be installed between the free wheel 429 and its shaft so that the free wheel 429 may rotate freely relative to the connector 423. A shaft 481 has a sleeve 482 which is connected with the frame 491. A wheel 483 is mounted on the shaft 481 (FIG. 8B). The wheel 483 has a carved track 484 so the free wheel 429 may fit in and slide in the carved track. The rotation of the wheel 483 around the axis of the shaft 481 is driven by a motor (not shown in Figure) which may be controlled by a computer system (e.g. 310 in FIGS. 3, 5, 6, 7, 9, or 710 in in FIG. 7, not shown in FIGS. 4A-4B, 8A-8C). As the wheel 483 rotates, the free wheel 429 is moved, and the connector 423 is rotated around the axis of the shaft 425. The lid 406 may thus be moved to different positions as shown in FIGS. 8B and 8C. In the position of FIG. 8B, the lid 406 may lid or seal a frying pan, while in FIG. 8C, the lid may be moved away from a frying pan.

The lid 405 and the lid-movement mechanism in the automated cooking apparatus 500, or the lid 406 and the lid-movement mechanism in the automated cooking apparatus 600 or 700 or the apparatus 800 are mounted on a frame (212 in FIGS. 5 and 6 or 491 in FIGS. 7-8C) that may be moved by a motion mechanism, so that the lid 405 or 406 may be moved together with the frying pan by the motion mechanism. The lid may be able to cover the frying pan while the motion mechanism moves the frame and the frying pan to stir, mix, and distribute the food ingredients in the frying pan. In particular, the lid, in the position to cover the frying pan, may be used to help prevent the food ingredients from jumping out of the frying pan during the stirring, mixing and distributing process. This is different from the traditional automated lid that is mounted on a base frame, in which case the lid needs to stay away from the frying pan when the frying pan is moved by a motion mechanism.

It should be noted that the lid 405 or 406 can have a different shape and be made by different materials. It can be partially made by a net, or can have an opening, so that the heated air or vapors may escape from the interior of the frying pan, while the lid covers the frying pan to prevent the food ingredients from jumping out.

Figure 9:
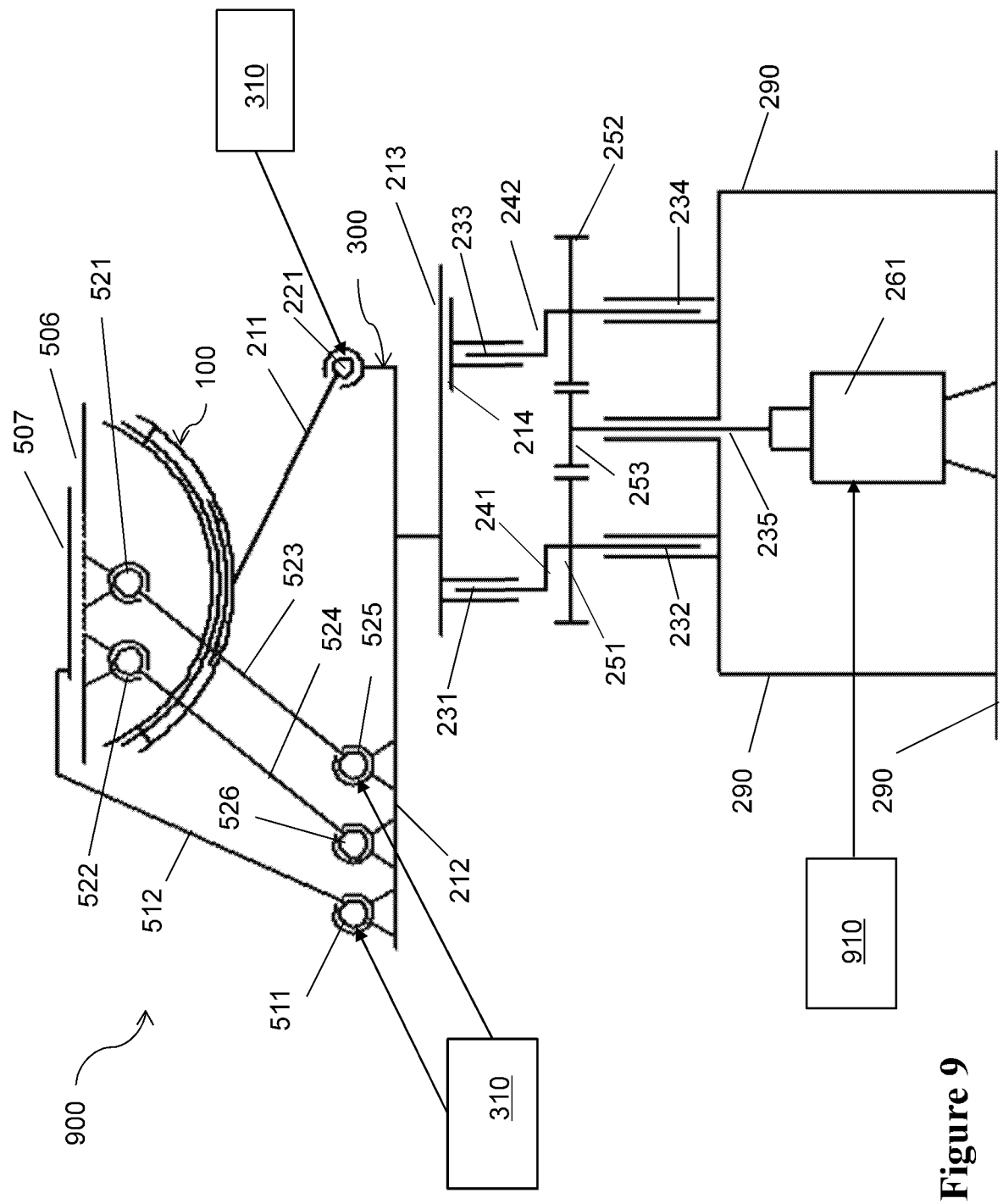
FIG. 9 shows a schematic view of an automated cooking apparatus with an automated lid with opening and an automated cover for the opening.

In some embodiments, referring to FIG. 9, an automated cooking apparatus 900 includes the automated cooking apparatus 300, a lid 506 and a cover 507, and their respective movement mechanisms as follows. The sleeves of two shafts 521 and 522 are connected with the cover 506. The shafts 521 and 522 are respectively connected to shafts 525 and 526 through connectors 523 and 524 respectively. The sleeves of the shafts 525 and 526 are both connected to the frame 212. A shaft 511 is connected to the cover 507 through a connector 512. The sleeve of the shaft 511 is connected with the frame 212, so the shaft 511 may rotate relative to the frame 212. A motor (not shown in Figure) can drive the rotation of the shaft 525 relative to the frame 212 under the control of the computer system 310; and another motor (not shown in Figure) can drive the rotation of the shaft 511 relative to the frame 212 under the control of the computer system 310.

It should be noted that the lid 506 may have an opening, or may be partially or entirely made of a net. Thus the cover 507 is needed in order to trap the heated air or vapors in the frying pan. Having the lid 506 closed on the frying pan while leaving the cover 507 open, can help prevent the food or food ingredients in the frying pan from jumping out while the heated air in the frying pan may exchange with air from the outside of the frying pan.

Figure 10B:
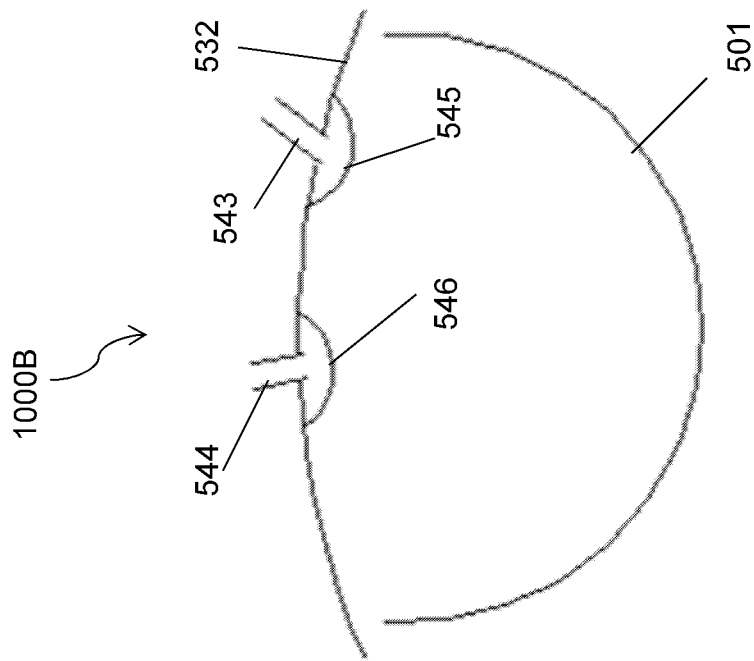
FIG. 10B shows a schematic view of another lid and a frying pan.
Figure 10A:
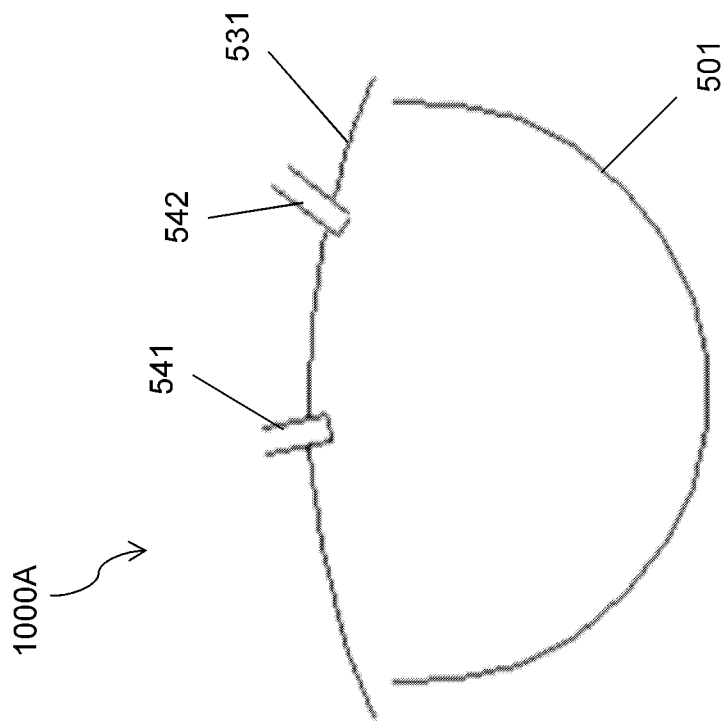
FIG. 10A shows a schematic view of a lid and a frying pan.

In some embodiments, referring to FIG. 10A, a covering apparatus 1000A for a frying pan includes a lid 531, and an air inlet 541 and an air outlet 542 through the lid 531. The flow of air through the air inlet 541 and through the air outlet 542 may be regulated by air pumps under the control of a computer system.

In some embodiments, referring to FIG. 10B, a covering apparatus 1000B for a frying pan includes a lid 532, and an air inlet 541 and an air outlet 542 through the lid 531. A net 545 is installed on the inside of the lid 532 as to cover the inlet 543; and a net 546 is installed on the inside of the lid 532 as to cover the outlet 544. The flow of air through the air inlet 543 and through the air outlet 544 may be regulated by air pumps under the control of a computer system.

Figure 11A:
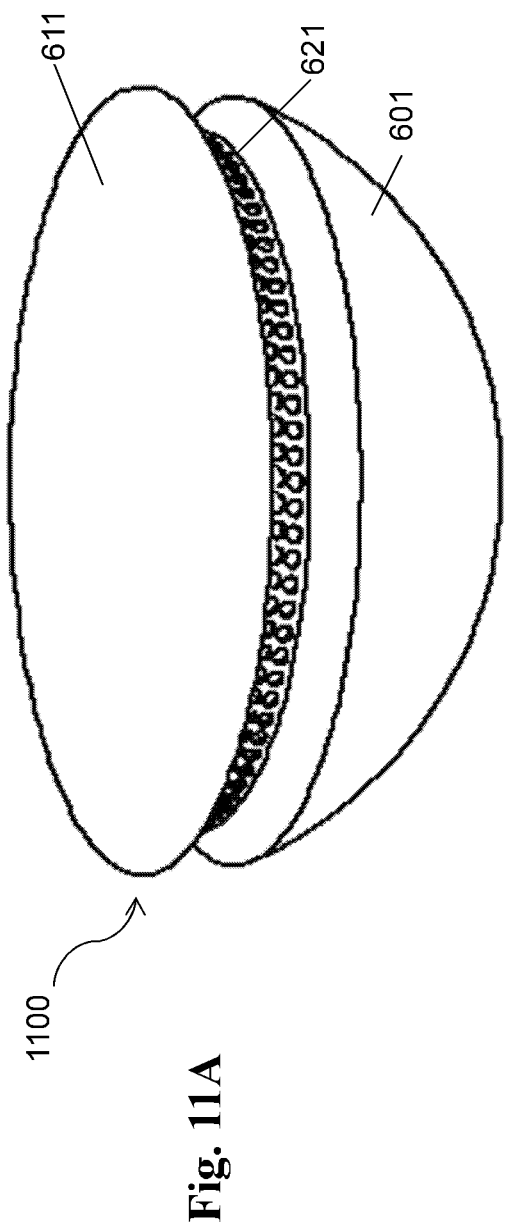
FIGS. 11A 11B show an aerial view and side view of a lid and a frying pan.
Figure 11B:
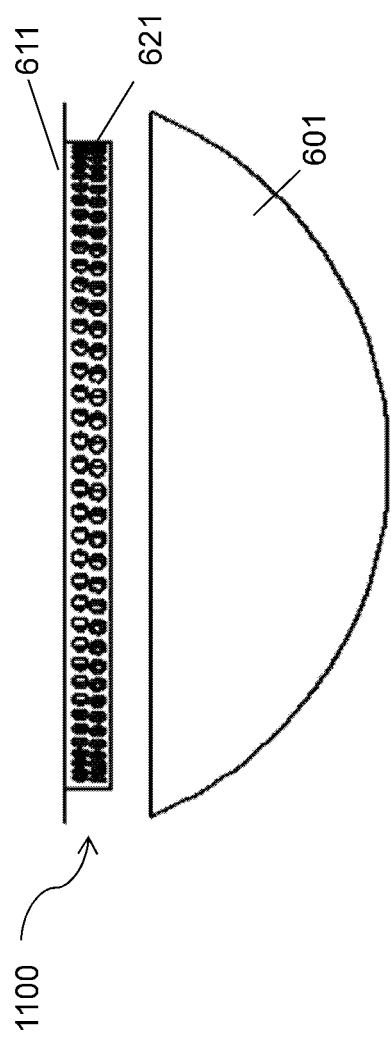

In some embodiments, referring to FIGS. 11A-11B, a covering apparatus 1100 for a frying pan includes a solid lid 611 and a net 621 in the shape of a cylinder. The solid lid 611 may be a flat board, or may be a curved board, and may be moved to and away from a position as to cover a frying pan 601. The net 621 is used to obstruct the jumping food ingredients from going out of the frying pan while allowing air circulation between inside the frying pan and outside, when the solid lid 611 is at a short distance away from a position to cover the frying pan 601.

In some embodiments, referring to FIGS. 12A-12B, a covering apparatus 1200 for a frying pan includes a solid lid 612 and a net or screen 622 in a different shape than a round cylinder.

Figure 13A:
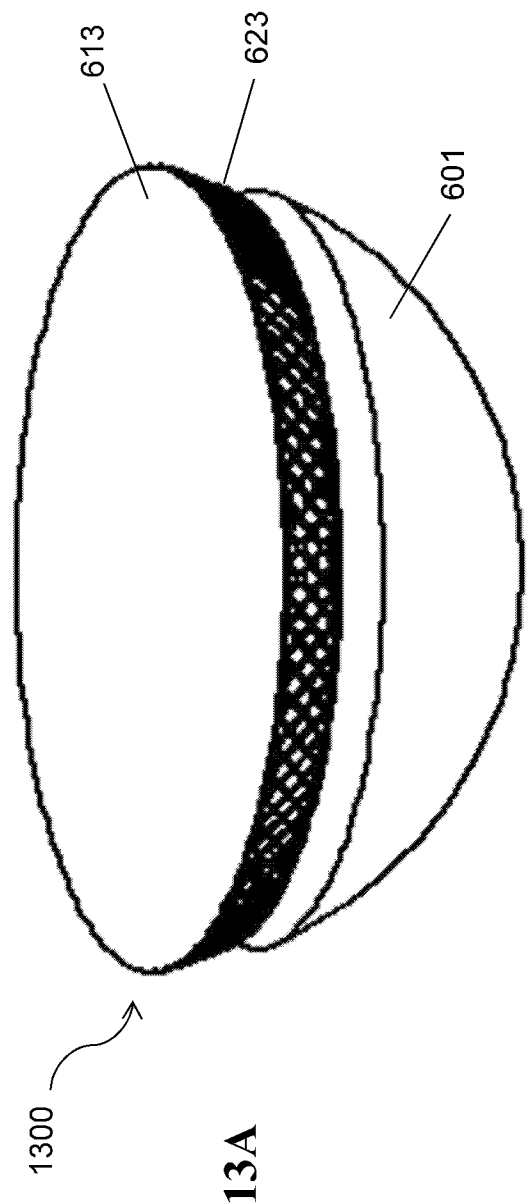
FIGS. 13A-13B show an aerial view and side view of a lid and a frying pan.
Figure 13B:
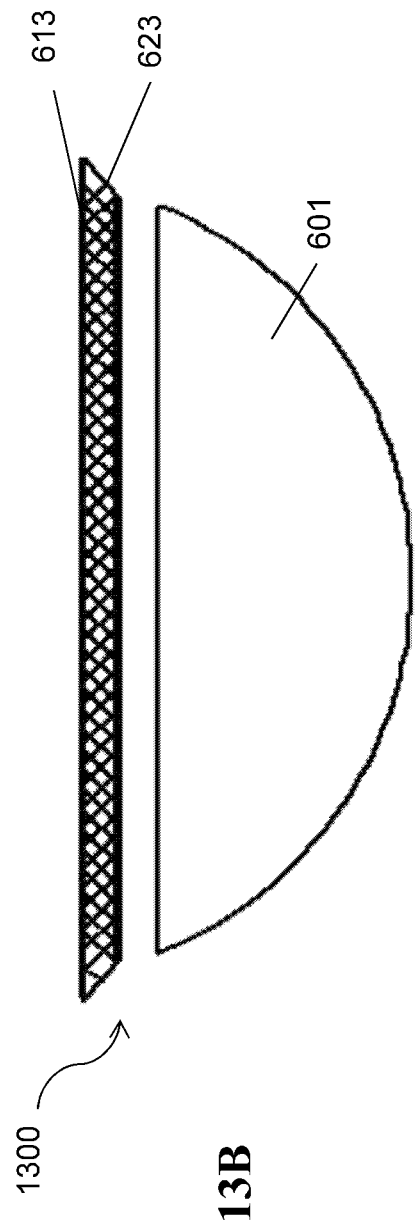

In some embodiments, referring to FIGS. 13A-13B, a covering apparatus 1300 for a frying pan includes a solid lid 613 and a net or screen 623 in the shape of a cone along the rim of the frying pan 601.

In some embodiments, referring to FIGS. 14A-14B, a covering apparatus 1400 for a frying pan 601 includes a solid lid 614 and a net or screen 624 along the rim of the frying pan 601.

In some embodiments, referring to FIGS. 15A-15B, a cooking apparatus 1500 includes a frying pan 701 and a covering device 1510 for the frying pan 701. The covering device 1510 includes a lid 706 with an opening at its center, and a cover 708 which may close on the opening of the lid 706. A turning pair consists of a shaft 711 which is connected to the lid 706, and a sleeve 712 connected to the cover 708. The sleeve of a shaft 721 is connected to the cover 708 through a first connector 722. A second connector 724 joins the shaft 721 with a shaft 731. A third connector 726 joins the sleeve of the shaft 731 with the sleeve of a shaft 751. A pneumatic cylinder 735 may move the shaft 751 in a linear direction. The linear direction of movement of the shaft 751 may be perpendicular to the axis of the shaft 751. The pneumatic cylinder 735 is mounted on the lid 706, and may be controlled by a computer system (e.g. 310 in FIGS. 3, 5, 6, 7, 9, or 710 in FIG. 7). The sleeve of a shaft 761 is connected to a middle part of the connector 726. The shaft 761 is connected with another shaft 771 by a fourth connector 727. The sleeve of the shaft 771 is connected with the lid 706 by a connector 728. The axes of the shafts 711, 721, 731, 751, 761, 771 are parallel to each other. As the shaft 751 is moved by the pneumatic cylinder 735, the shafts 731 and 721 may be moved relative to the lid 701, as to open or close the cover 706 on the opening of the lid 701.

Figure 16A:
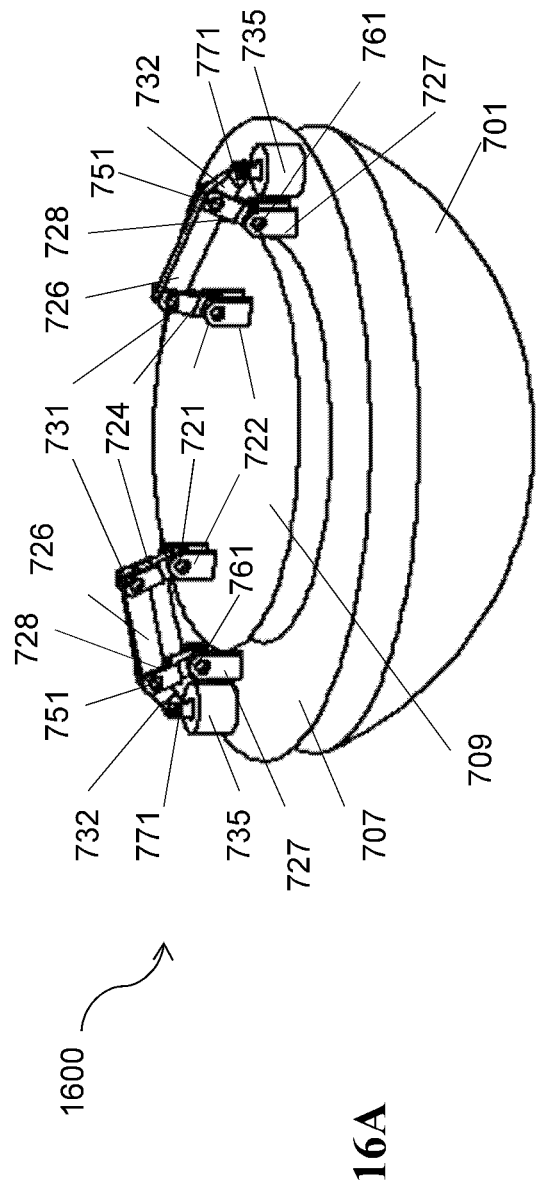
FIGS. 16A-16B show an aerial view and side view of another automated lid and a frying pan.
Figure 16B:
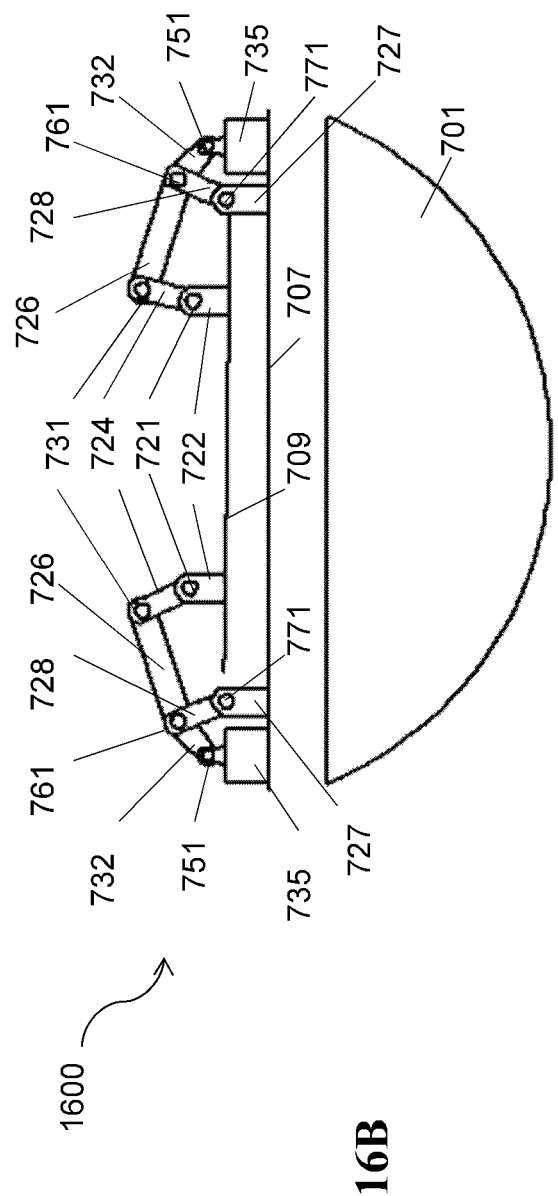

In some embodiments, referring to FIGS. 16A-16B, a cooking apparatus 1600 includes a frying pan 701, a lid 707 with an opening at its center, and a cover 709. Two connectors 724 join two shafts 721 respectively with two shafts 731. The sleeves of the shafts 721 are connected to the cover 709 by respective connectors 722. Two connectors 726 join the sleeves of the shafts 731 respectively with the sleeves of two shafts 751. Two pneumatic cylinders 735 are mounted on the lid 707, and may respectively move the shafts 751 in a linear direction. The linear direction of movement of the shafts 751 may be perpendicular to the axes of the shafts 751. The pneumatic cylinders 735 may be controlled by a computer system. The sleeves of two shafts 761 are connected respectively to some middle parts of the connectors 726. The shafts 761 are respectively connected with another two shafts 771 by connectors 727. The sleeves of the shafts 771 are connected with the lid 707 by connectors 728.

It should be noted that the pneumatic cylinder(s) 735 in the cooking apparatus 1500 or 1600 may be substituted by device(s) that can move the shaft(s) 751 in a linear direction; such as, lead-screw or ball screw mechanism, or hydraulic cylinder or electromagnetic cylinder, etc.

It should be noted that there are many other implementations for the automated opening and closing of a cover on a lid. For example, a cover may rotate or slide relative to the lid, and a motor may drive such rotation or sliding.

Figure 17B:
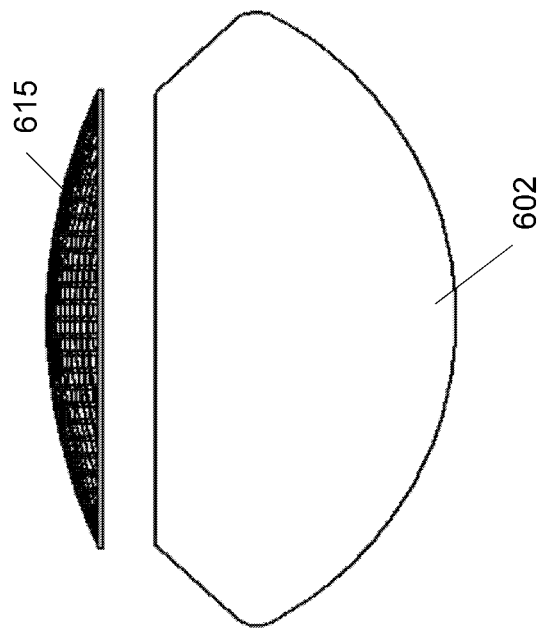
FIGS. 17A-17B show an aerial view and side view of a porous lid and a frying pan.
Figure 17A:
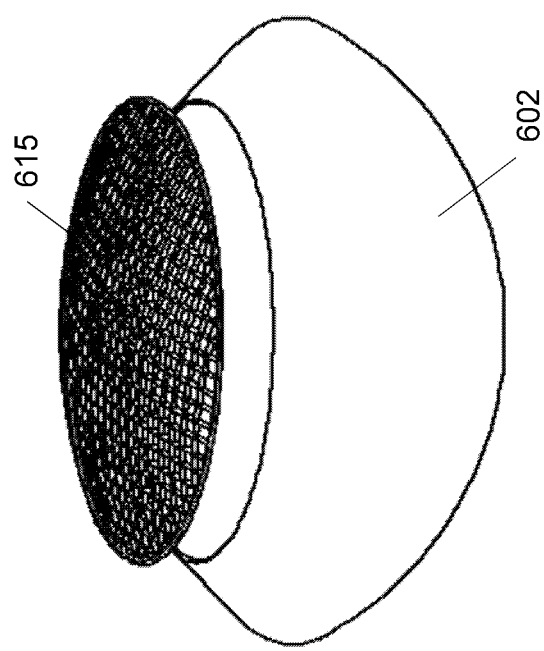

In some embodiments, referring to FIGS. 17A-17B, at least a portion of a lid 615 for a frying pan 602 is covered by a net or a screen 616, which allows air and vapors to come in and out of the frying pan 602. The lid may close on the pan, as to prevent food ingredients from jumping out of the frying pan.

Figure 18A:
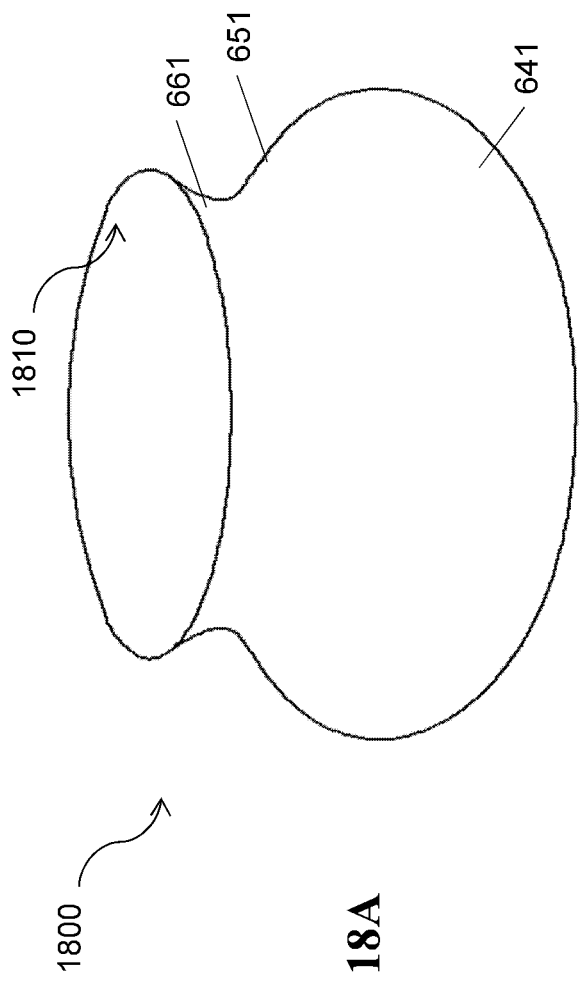
FIGS. 18A-18B show an aerial view and side view of a frying pan.
Figure 18B:
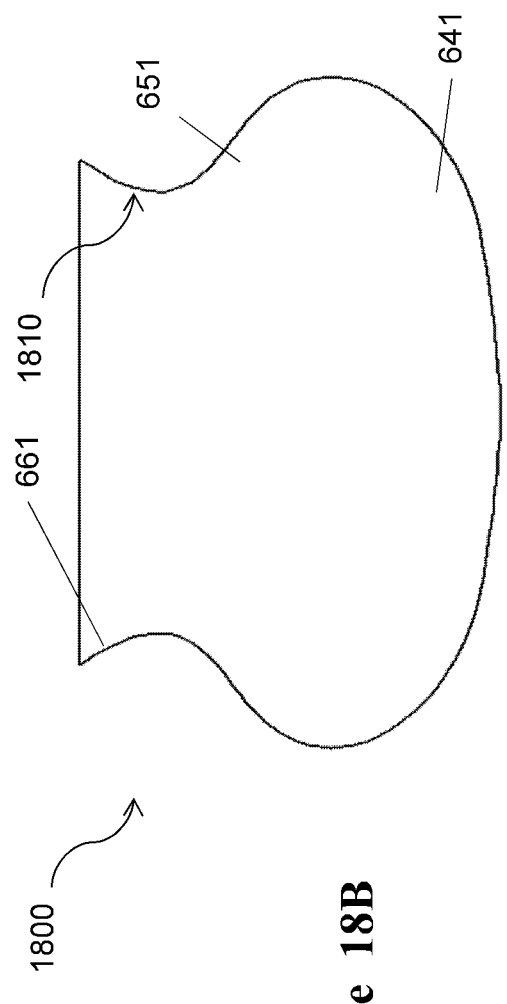

In some embodiments, referring to FIGS. 18A-18B, a frying pan 1800 has an interior surface 1810 consisting of three parts: part 641 where the interior surface is faced upward, part 651 where the interior surface is faced downward, and part 661 where the interior surface is faced upward. The part 651 may obstruct some food ingredients from jumping out of the frying pan.

Figure 19A:
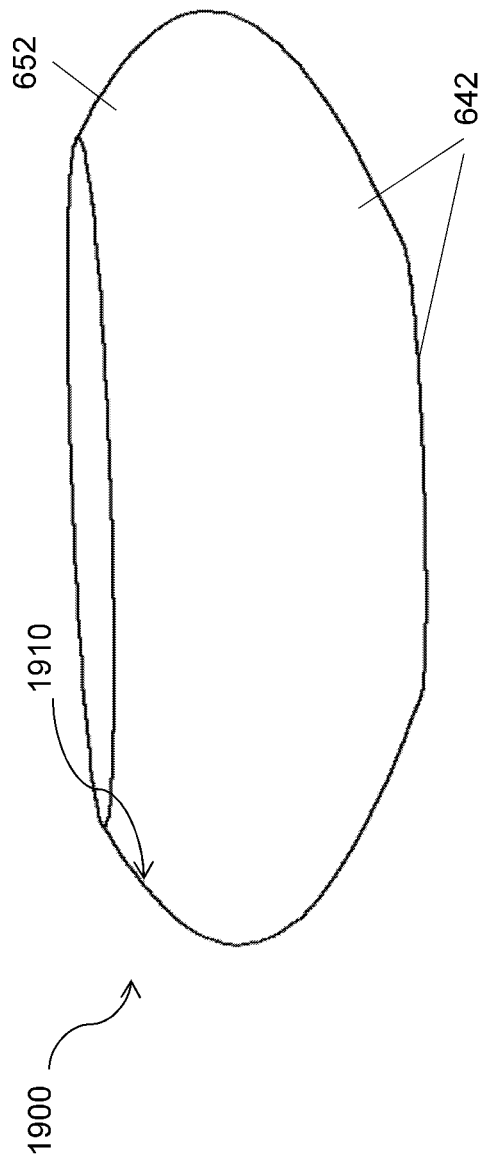
FIGS. 19A-19B show an aerial view and side view of a frying pan with flat bottom.
Figure 19B:
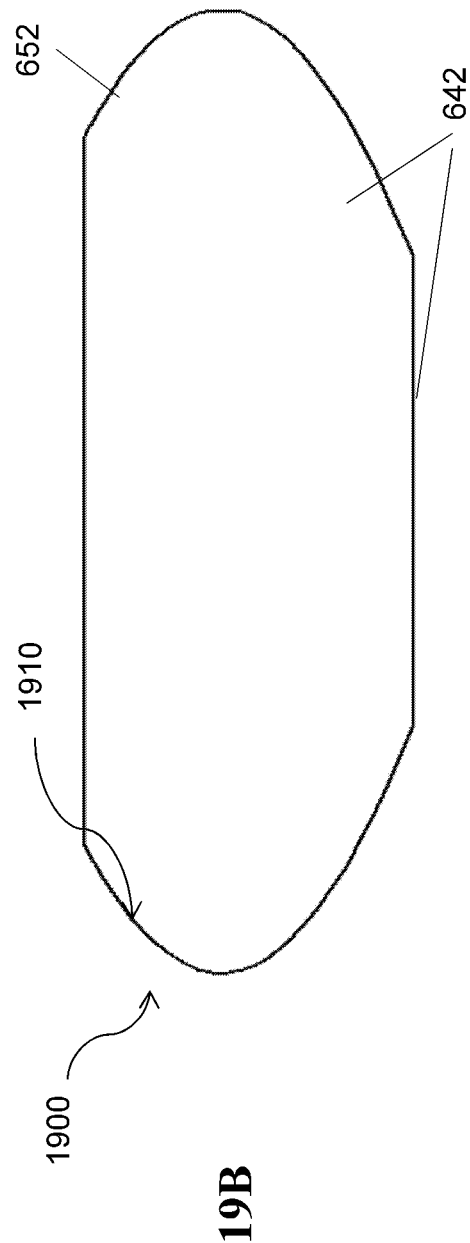

In some embodiments, referring to FIGS. 19A-19B, a frying pan 1900 has an interior surface 1910 consisting of two parts: part 642 where the interior surface is faced upward, part 652 where the interior surface is faced downward. The bottom of the frying pan 1900 is flat, where the corresponding interior surface included in the part 652. The part 652 may obstruct some food ingredients from jumping out of the frying pan.

In some embodiments, referring to FIGS. 20A-20B, a frying pan 2000 has an interior surface 2010 consisting of two parts: part 643 where the interior surface is faced upward, part 653 where the interior surface is faced downward. The part 653 may obstruct some food ingredients from jumping out of the frying pan.

Figure 21A:
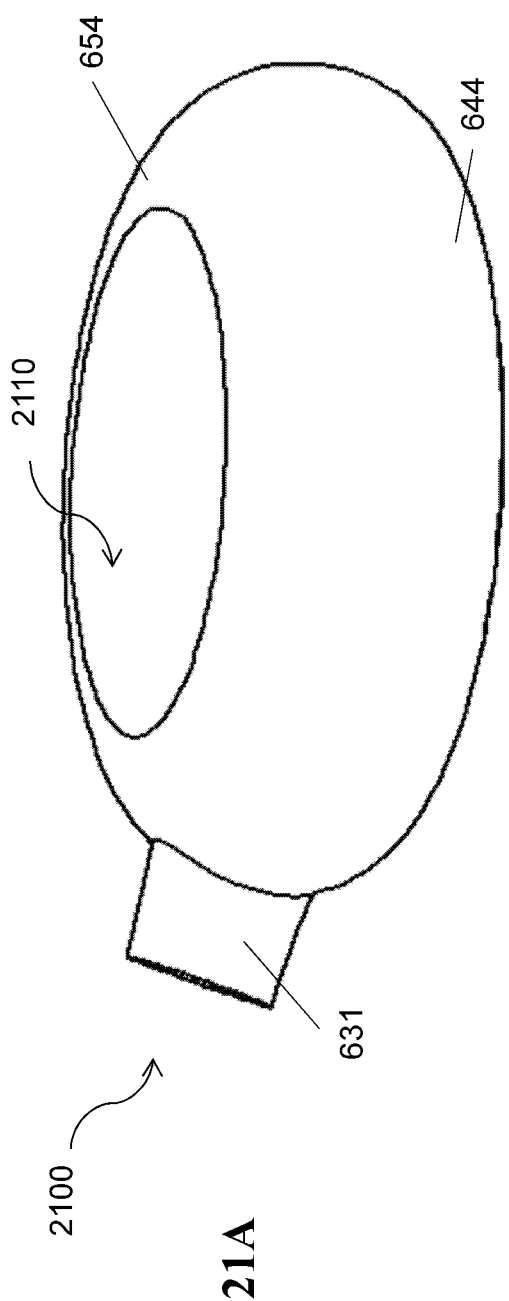
FIGS. 21A-21B show an aerial view and side view of a frying pan with an opening.
Figure 21B:
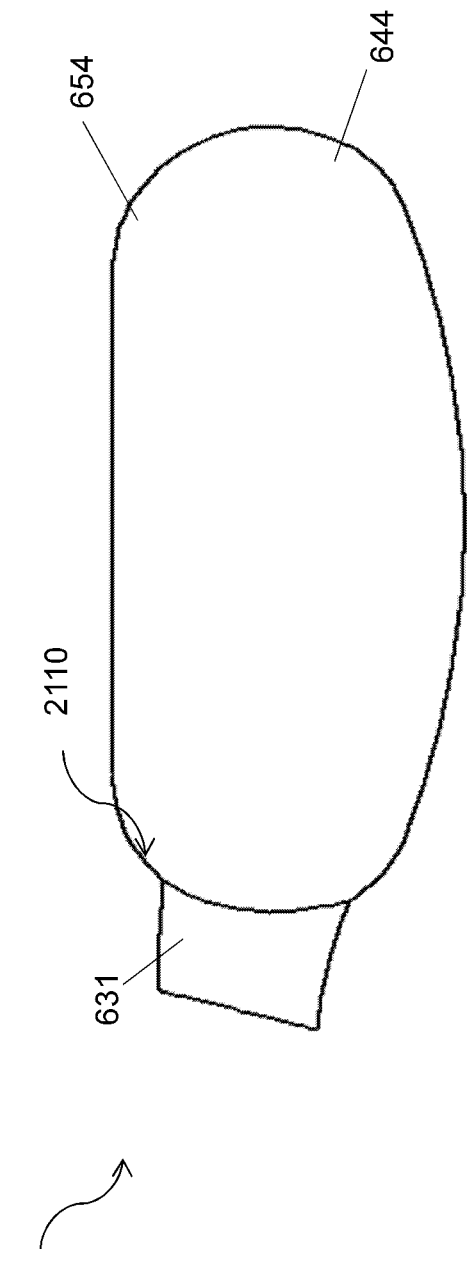

In some embodiments, referring to FIGS. 21A-21B, a frying pan 2100 has an interior surface 2110 has a part 644 which is faced upward, part 654 which is faced downward. The frying pan also has an opening 631, so that the cooked food or semi-cooked food in the frying pan may be unloaded through the opening 631. The part 654 may obstruct some food ingredients from jumping out of the frying pan.

It should be noted that an automated lid may be used to seal the opening 631 as to trap the heated air or vapors from escaping through the opening. In addition, an automated porous lid such as a net may also be used to help prevent the food or food ingredients from jumping out through the opening while the heated air or vapors in the frying pan may get out through the porous lid.

In some embodiments, referring to FIGS. 22A-22B, a frying pan 2200 includes an interior surface 2210 that includes a portion 645 facing upward, a portion 655 facing downward. The frying pan 2200 includes a spout 632 so the cooked food or semi-cooked food may be unloaded through the spout 632. The part 655 may obstruct some food ingredients from jumping out of the frying pan.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, other heating mechanisms such as microwave heater, convection heater can be suitable for the disclosed apparatus.

The cooking operation by the cooking apparatus may include but is not limited to: pan fry, stir fry, deep fry, sautéing, hot sand frying, stewing. The cooking apparatus is also not limited to any particular ethnic styles such as, the cooking of Asian, Mexican, Middle Eastern, or European food. A frying pan can have a texture, a barrier, and be non stick.

What is claimed is:

1. An automated cooking apparatus, comprising:
    a computer configured to store a recipe;
    a sub-apparatus comprising:
        a cooking container configured to hold food or food ingredients;
        a lid configured to close on the cooking container; and
        a lid-movement mechanism configured to open and close the lid on the cooking container;
        wherein the cooking container and the lid-movement mechanism are configured to be connected to each other; and
    a motion mechanism comprising a motor, said motion mechanism being configured to produce a motion of the cooking container and the lid-movement mechanism of the sub-apparatus;
    wherein the motion of the cooking container produced by the motion mechanism is configured to induce mixing, stirring, or distributing of the food or food ingredients contained in the cooking container;
    wherein the computer is configured to control the lid-movement apparatus and the motion mechanism according to the recipe;
    wherein the lid-movement mechanism is configured to open or close the lid on the cooking container under the control of the computer, while the motion mechanism produces a motion in the sub-apparatus and hence a motion in the lid-movement mechanism under the control of the computer.

2. The automated cooking apparatus of claim 1 further comprising a heater, wherein the cooking container and the heater are configured to be fixed relative to each other.

3. The automated cooking apparatus of claim 1, wherein the lid comprises one or more openings.

4. The automated cooking apparatus of claim 3, wherein the one or more openings in the lid are covered by a net or a screen.

5. The automated cooking apparatus of claim 3, further comprising:
    a cover configured to close the one or more openings in the lid or keep the one or more openings in the lid open under the control of the computer, for regulating air flow in and out of the cooking container.

6. The automated cooking apparatus of claim 5, wherein the cover is configured to be opened or closed while the motion mechanism moves the cooking container and the lid-movement mechanism under the control of the computer.

7. The automated cooking apparatus of claim 6, wherein the cover is hinged to the lid.

8. The automated cooking apparatus of claim 6, wherein the cover is separable from the lid.

9. The automated cooking apparatus of claim 1 further comprising a heater configured to heat the cooking container, and a thermal insulation configured to keep the heat in the cooking container.

10. The automated cooking apparatus of claim 1, further comprising:
   a dispensing mechanism configured to dispense food ingredients into the cooking container under the control of the computer; and
   an unloading mechanism configured to turn the cooking container to unload the cooked food from the cooking container.

11. The automated cooking apparatus of claim 1, wherein the cooking container comprises an opening configured to unload the food ingredients from the cooking container.

12. The automated cooking apparatus of claim 11, wherein the opening has a shape of a tunnel.

13. The automated cooking apparatus of claim 11, further comprising:
   a cover configured to cover and seal the opening under the control of the computer.

14. The automated cooking apparatus of claim 1, wherein the cooking container has a portion of an interior surface facing downward which obstructs the food ingredients from jumping out of the cooking container when the food ingredients are mixed, stirred, or distributed by the motion mechanism.

15. The automated cooking apparatus of claim 1, further comprising a frame configured to support the cooking container and the lid-movement mechanism, wherein the motion mechanism is configured to move the frame under the control of the computer.

16. The automated cooking apparatus of claim 1, wherein the lid-movement mechanism is configured to move the lid by rotation, or a linear motion, or a combination thereof.

17. The automated cooking apparatus of claim 1, wherein the sub-apparatus comprises a frame.

18. The automated cooking apparatus of claim 1, wherein the lid includes an inlet and an outlet, the automated cooking apparatus further comprising:
   an air pump configured to pump air into the inlet, and/or to exhaust air from the outlet under the control of the computer.

19. An automated cooking apparatus, comprising:
   a computer configured to store a recipe;
   a sub-apparatus comprising:
      a cooking container configured to hold food or food ingredients;
      a heater configured to heat the cooking container;
      a lid configured to close on the cooking container; and
      a lid-movement mechanism configured to open and close the lid on the cooking container;
   wherein the cooking container, the heater and the lid-movement mechanism are configured to be connected to each other; and
   a motion mechanism comprising a motor, said motion mechanism being configured to produce a motion of the cooking container, the heater, and the lid-movement mechanism of the sub-apparatus;
   wherein the motion of the cooking container produced by the motion mechanism is configured to induce mixing, stirring, or distributing of the food or food ingredients contained in the cooking container;
   wherein the computer is configured to control the heater, the lid-movement apparatus and the motion mechanism according to the recipe;
   wherein the lid-movement mechanism is configured to open or close the lid on the cooking container under the control of the computer, while the motion mechanism produces a motion in the sub-apparatus under the control of the computer.

20. An automated cooking apparatus, comprising:
   a computer configured to store a recipe;
   a sub-apparatus comprising:
      a cooking container configured to hold food or food ingredients; and
      a heater configured to heat the cooking container;
      wherein the cooking container and the heater are configured to be connected to each other; and
   a motion mechanism configured to produce a motion of the sub-apparatus and hence motions in the cooking container and the heater, said motion mechanism comprising:
      a first component configured to be connected to the sub-apparatus;
      a second component configured to be rotatable relative to said first component;
      a third component configured to be connected to said second component; and
   a motorized mechanism comprising a motor, said motorized mechanism being configured to produce a rotation of said third component around an axis that is different from the axis of rotation of said second component relative to said first component;
   wherein the motion of the cooking container produced by the motion mechanism is configured to induce mixing, stirring, or distributing of the food or food ingredients contained in the cooking container;
   wherein the computer is configured to control the heater and the motion mechanism according to the recipe.

* * * * *